United States Patent
Fujisaki

(10) Patent No.: US 7,386,429 B1
(45) Date of Patent: Jun. 10, 2008

(54) WRINKLE SIMULATION SOFTWARE

(76) Inventor: Iwao Fujisaki, 3-5-8-313, Musashinoshi Kichijouji, Kitamachi, Tokyo 180-0001 (JP)

( * ) Notice: Subject to any disclaimer, the term of this patent is extended or adjusted under 35 U.S.C. 154(b) by 923 days.

(21) Appl. No.: 10/065,923

(22) Filed: Nov. 30, 2002

Related U.S. Application Data

(60) Provisional application No. 60/337,949, filed on Dec. 7, 2001.

(51) Int. Cl.
 *G06G 7/48* (2006.01)
(52) U.S. Cl. .......................... 703/6; 703/11; 345/420; 345/426
(58) Field of Classification Search ................ 703/22, 703/6, 11; 1/2; 345/419, 420, 426
See application file for complete search history.

(56) References Cited

U.S. PATENT DOCUMENTS

| | | | | |
|---|---|---|---|---|
| 5,267,154 A | * | 11/1993 | Takeuchi et al. | 345/473 |
| 5,504,845 A | * | 4/1996 | Vecchione | 345/419 |
| 5,625,577 A | * | 4/1997 | Kunii et al. | 703/2 |
| 5,687,737 A | * | 11/1997 | Branham et al. | 600/523 |
| 5,802,220 A | * | 9/1998 | Black et al. | 382/276 |
| 5,850,222 A | * | 12/1998 | Cone | 345/418 |
| 6,064,390 A | * | 5/2000 | Sagar et al. | 345/420 |
| 6,074,270 A | * | 6/2000 | Wilcox et al. | 446/370 |
| 6,088,034 A | * | 7/2000 | Deering | 345/420 |
| 6,144,385 A | * | 11/2000 | Girard | 345/424 |
| 6,204,860 B1 | * | 3/2001 | Singh | 345/420 |
| 6,215,500 B1 | * | 4/2001 | Deering | 345/426 |
| 6,310,619 B1 | * | 10/2001 | Rice | 345/420 |
| 6,317,125 B1 | * | 11/2001 | Persson | 345/423 |
| 6,317,130 B1 | * | 11/2001 | Ishikawa et al. | 345/473 |
| 6,320,988 B1 | * | 11/2001 | Yamaguchi et al. | 382/276 |
| 6,322,448 B1 | * | 11/2001 | Kaku et al. | 463/32 |
| 6,326,967 B1 | * | 12/2001 | Inoue | 345/427 |

FOREIGN PATENT DOCUMENTS

| | | |
|---|---|---|
| JP | 2001005999 | 12/2001 |
| JP | 2001006000 | 12/2001 |

OTHER PUBLICATIONS

Platt et al., S.M. Animating Facial Expressions, ACM SIGGRAPH Computer Graphics, Proceedings of the 8th Annual Conference on Computer Graphics and Interactive Techniques, Aug. 1981, pp. 245-252.*

(Continued)

*Primary Examiner*—Russell Frejd

(57) ABSTRACT

The present invention introduces a simulation software for displaying a human being comprised of a plurality of arm joints, wherein each of the plurality of arm joints comprises a 1st part and a 2nd part. The invention also displays one or more wrinkles on or near the joint of the 1st part and the 2nd part, wherein the 1st part and the 2nd part are connected, and the angle produced by the 1st part and 2nd part is variable. The more the value of the angle decreases, the more the amount and/or the height of the wrinkle increases, thereby enabling the wrinkle simulation software to display the movement of the human being and the movement of the 1st and the 2nd part in a realistic manner.

18 Claims, 64 Drawing Sheets

OTHER PUBLICATIONS

Wilhelms et al., J. Anatomically Based Modeling, Proceedings of the 24th Annual Conference on Computer Graphics and Interactive Techniques, Aug. 1997.*

Hodgins et al., J.K. Animating Human Athletics, Proceedings of the 22nd Annual Conference on Computer Graphics and Interactive Techniques, Sep. 1995, pp. 71-8.*

Kalra et al., P. Real-Time Animation of Realistic Virtual Humans, IEEE, Computer Graphics and Applications, vol. 18, No. 5, Sep. 1998, pp. 42-56.*

Perez-Urbiola et al., R.E. Multi-layer Implicit Garment Models, IEEE, Shape, Modeling, and Applications, Mar. 1999, pp. 66-71.*

* cited by examiner

Area 302

| 180 | Wrinkle Amount Data = 0 |
|---|---|
| 180 > x >= 160 | Wrinkle Amount Data = 1 |
| 160 > x >= 135 | Wrinkle Amount Data = 2 |
| 135 > x >= 110 | Wrinkle Amount Data = 3 |
| 110 > x >= 20 | Wrinkle Amount Data = 4 |

Area 304

| 180 | Wrinkle Hight Data = 0 |
|---|---|
| 180 > x >= 160 | Wrinkle Hight Data = 1 |
| 160 > x >= 135 | Wrinkle Hight Data = 2 |
| 135 > x >= 110 | Wrinkle Hight Data = 3 |
| 110 > x >= 20 | Wrinkle Hight Data = 4 |

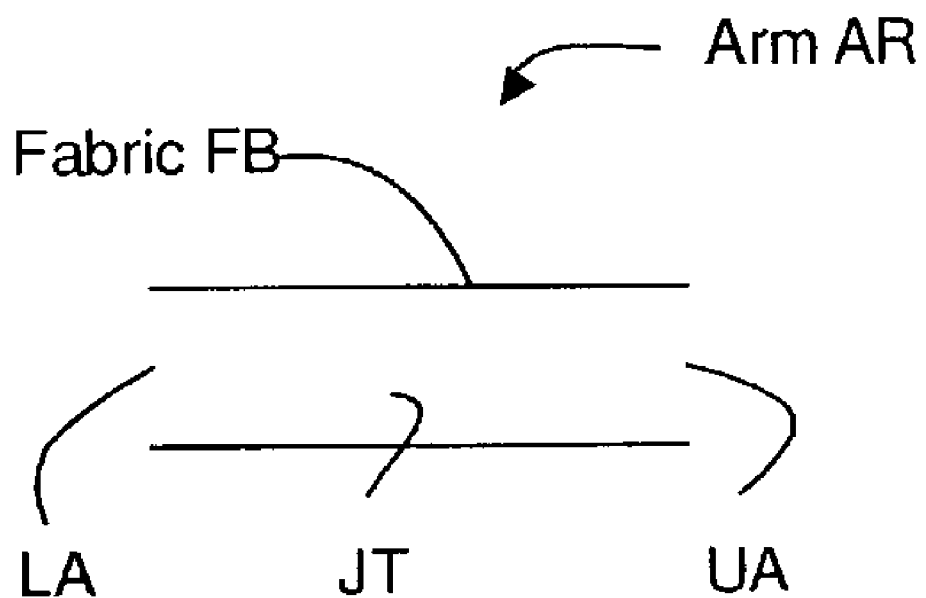

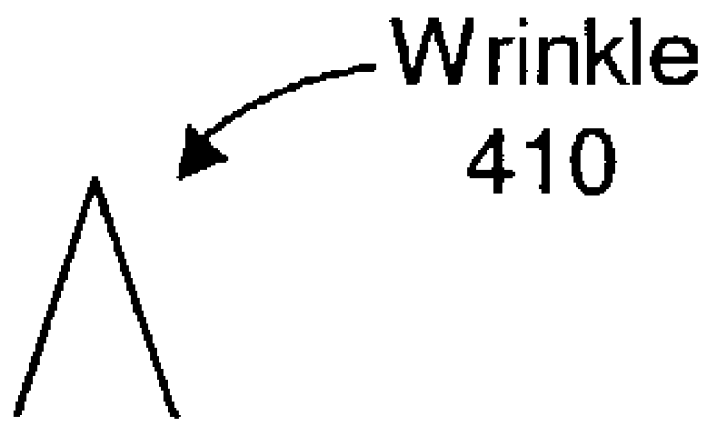

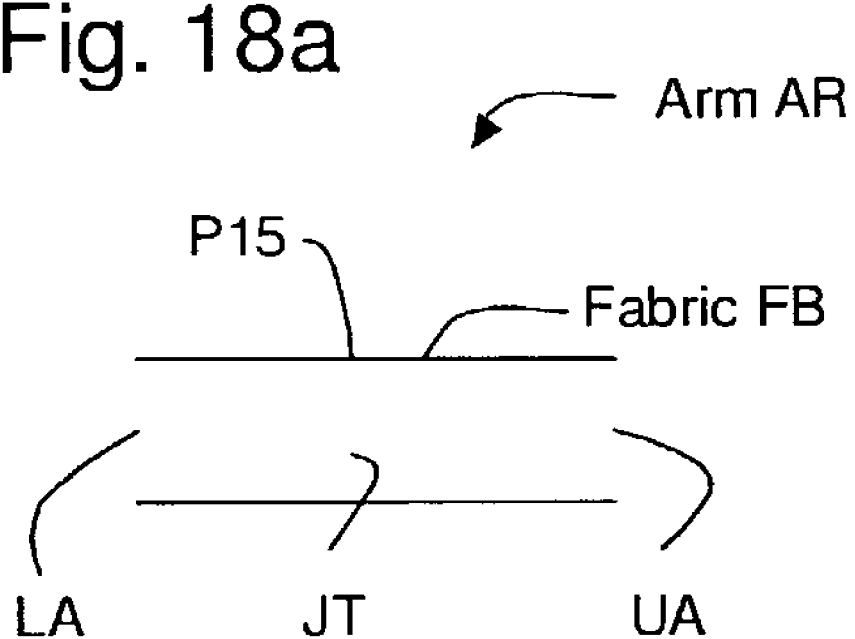

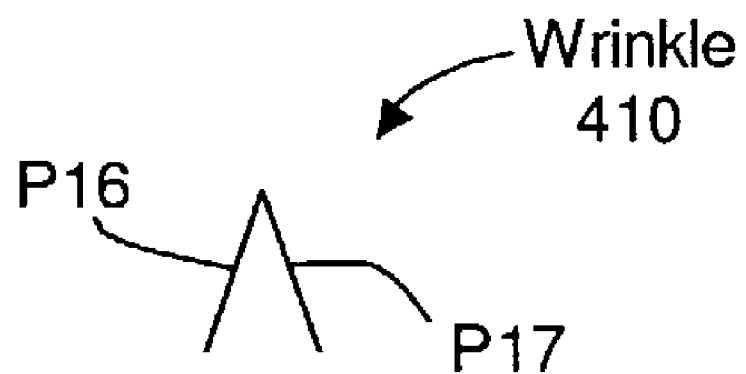

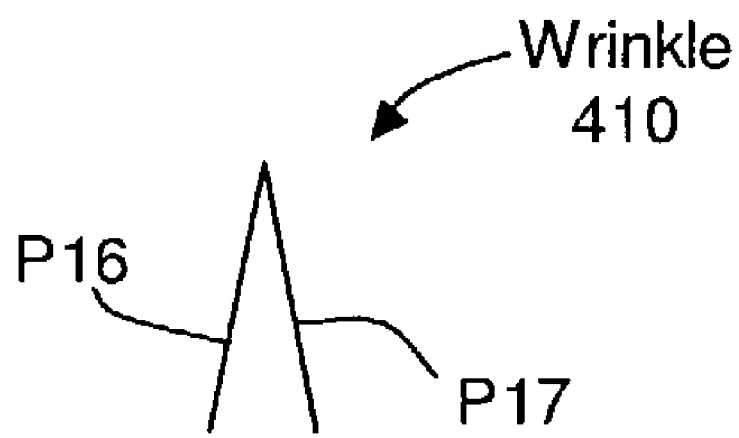

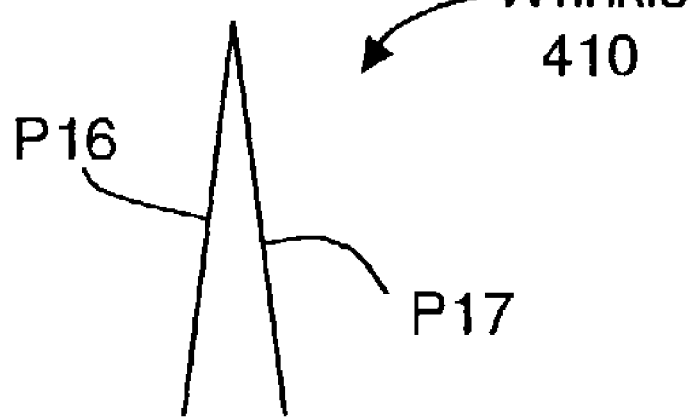

Fig. 20

Area 306

| 180 | Amount Data = 0 | Hight Data = 0 |
|---|---|---|
| 180 > x >= 160 | Amount Data = 1 | Hight Data = 1 |
| 160 > x >= 135 | Amount Data = 1 | Hight Data = 2 |
| 135 > x >= 110 | Amount Data = 3 | Hight Data = 1,2,1 |
| 110 > x >= 20 | Amount Data = 5 | Hight Data = 1,2,3,2,1 |

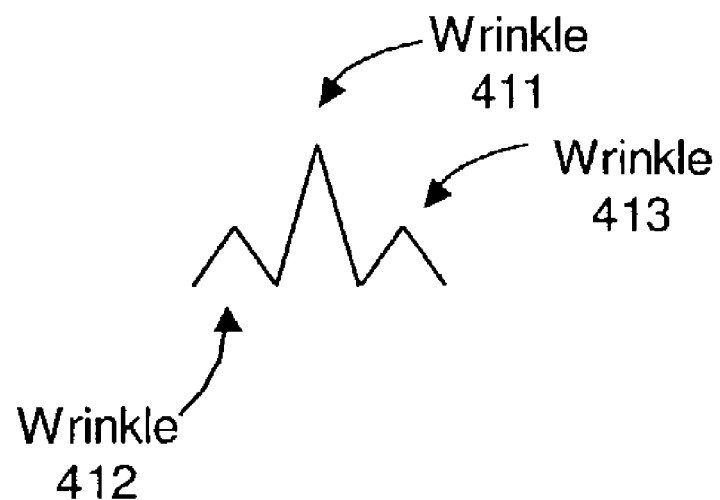

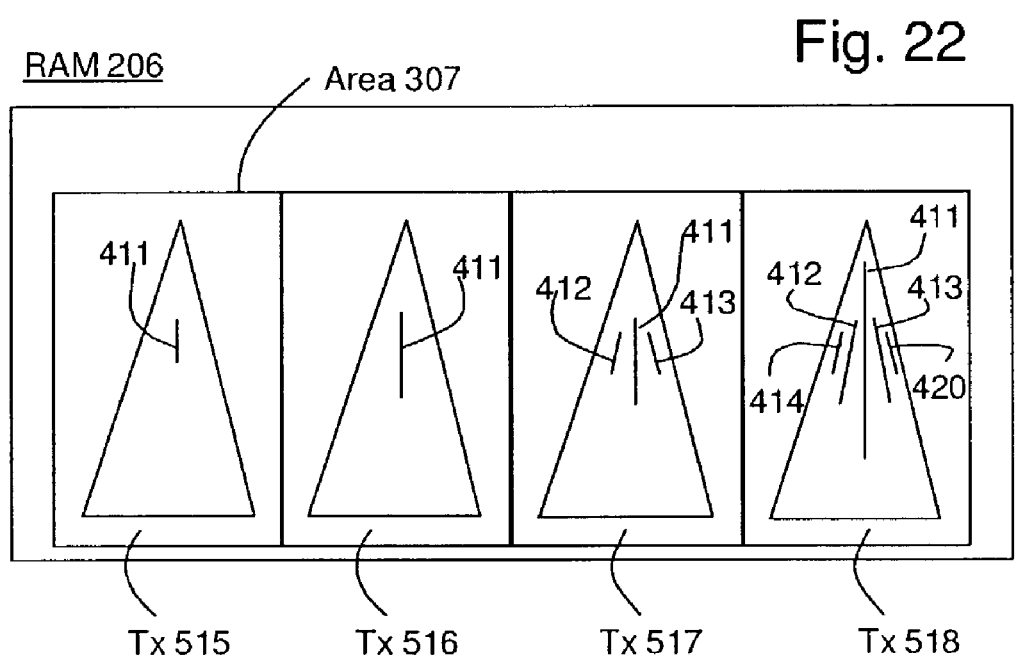

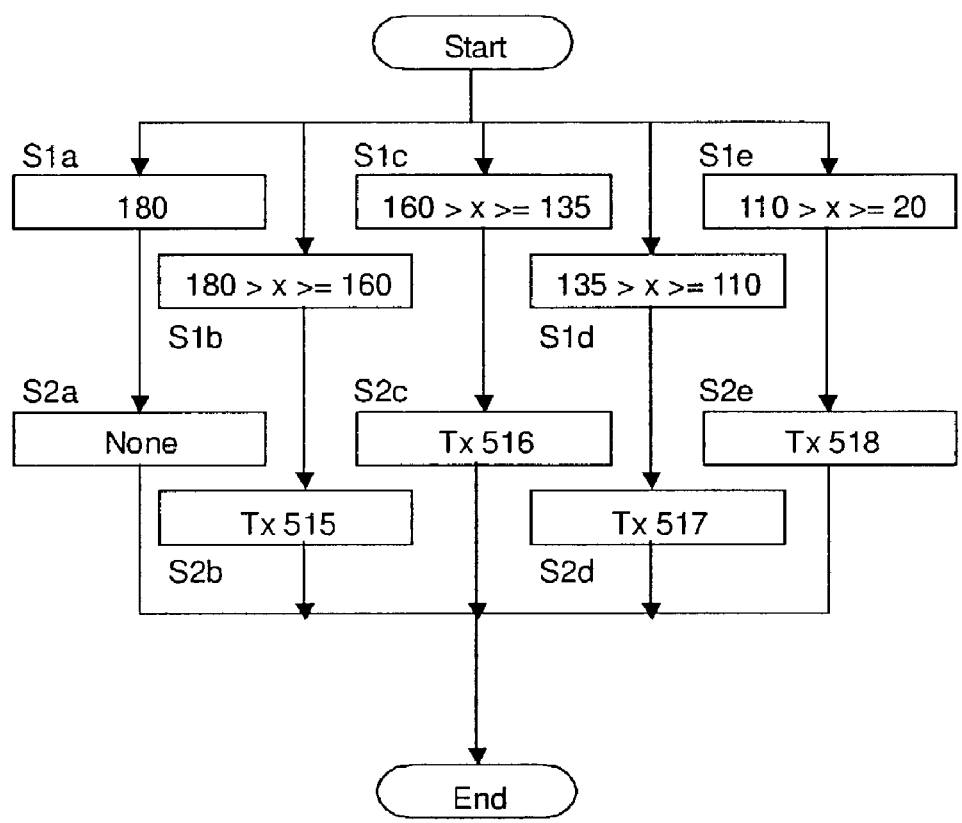

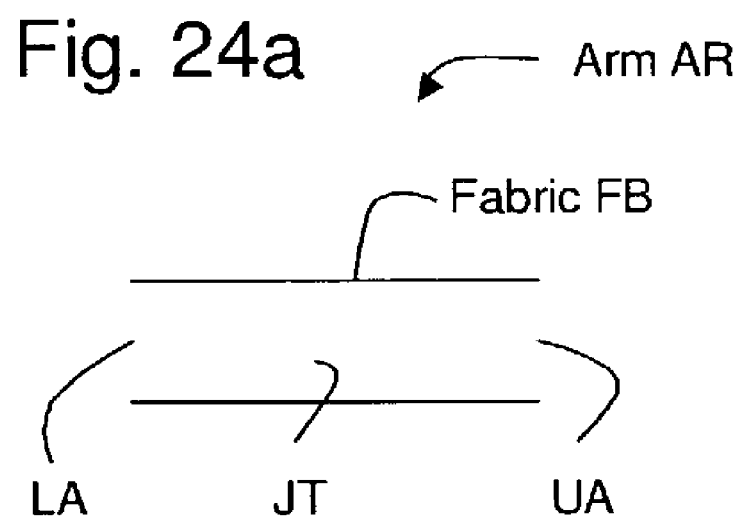

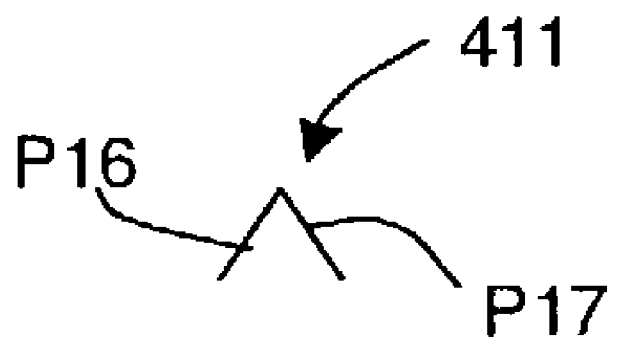

Area 309

Area 309

Fig. 29

| 180 | Muscle Property = 0 |
|---|---|
| 180 > x >= 160 | Muscle Property = 1 |
| 160 > x >= 135 | Muscle Property= 2 |
| 135 > x >= 110 | Muscle Property= 3 |
| 110 > x >= 20 | Muscle Property= 4 |

WRINKLE SIMULATION SOFTWARE

CROSS REFERENCE TO RELATED APPLICATIONS

This application claims the benefit of U.S. Provisional Application No. 60/337,949, filed Dec. 7, 2001, which is hereby incorporated herein by reference in its entirety.

BACKGROUND OF INVENTION

The invention relates to a simulation software and more particularly to a simulation software which displays human beings on monitors, LCDs, screens, and other display means in a realistic fashion.

Lately, simulation software is being used in video games, military training devices, and other types of devices which implement virtual reality. These devices are designed to display various types of objects which exist in the real world, however, the users thereof perceive a sense of awkwardness to the movement of a human being displayed thereon since these devices do not reflect the movement of a human being in the real world in a precise manner. One reason for such awkwardness is that the clothes worn by a human being do not wrinkle at all when he/she bends his/her limbs. FIG. 1a and FIG. 1b illustrate the method of displaying an arm of a human being by utilizing the prior art. As described in FIG. 1a, arm AR of a human being is composed of hand HD, lower arm LA, joint JT, and upper arm UA. Assuming that arm UA is covered by fabric FB, i.e., the human being is wearing the clothes which cover his/her arms. When arm AR is stretched as described in FIG. 1a and joint JT is not bent, wrinkle does not occur on or near joint JT. When arm AR is bent as described in FIG. 1b, due to the nature of fabric FB one or more wrinkles occur on or near joint JT in the real world. The prior art does not describe the movement of limbs in such a way and because no wrinkles are shown, the users perceive a sense of awkwardness.

U.S. Pat. No. 6,317,125 introduces a video object generation method (100) for converting a model (102) such that a tessellation operation (164) can create a realistic character in real time during game play. According to this prior art, a shelling and slicing operation (106) produces data strings (140) describing a plurality of slices (110) of the model (102). An assign body parts and edit strings operation (130) places cuts (134) on the model (102) and an apply influences operation (144) establishes the influence on each of a plurality of points (142) from a plurality of bones (148) of a skeleton (146). In real time operations (162) a tessellation operation (164) creates a triangle mesh (165) appropriate to the position and importance of the character in game space, and a properly bent character is displayed in a display operation (168). This prior art introduces the concept of producing realistic images, however, does not explain nor imply the present invention, i.e., the method of producing and displaying wrinkles on limbs of a human being.

U.S. Pat. No. 6,317,130 introduces apparatus and method to enable an animation character object, which is pictorially deformed by computer graphics techniques to display a human body or animal or the like in the form of a caricature or model, to offer precise and more natural motions at its selected constituent portions that have inherently no joints and no bones by giving thereto joints and skeletons. According to this prior art, apparatus and method for generating skeleton-based animation images in accordance with the principles of the invention include solving means as follows. A face section of a cubic character object is provided with auxiliary skeletons as vertically coupled together. Skeletons are provided which extend from respective endpoints of such auxiliary skeletons and are coupled defining an umbrella shape as a whole. These skeletons are associated with models each consisting of an ensemble of polygons for rendering the character deformable by changing rotation amount of each skeleton. This prior art introduces the concept of producing realistic images, however, does not explain nor imply the present invention, i.e., the method of producing and displaying wrinkles on limbs of a human being.

U.S. Pat. No. 6,310,619 introduces a three-dimensional, virtual reality, tissue specific model of a human or animal body which provides a high level of user-interactivity. According to this prior art, the model functions can be analyzed and user-modified on a tissue-by-tissue basis, thereby allowing modeling of a wide variety of normal and abnormal tissue attributes and corresponding study thereof. The model can be user-modified through a keyboard, or other VR tools such as a haptic interface. The haptic interface can modify the model to correspond to the tissue attributes of a user, and can provide sensory output corresponding to the interaction of the model to a prescripted scene. A three-dimensional, virtual reality, tissue specific model of a human or animal body which provides a high level of user-interactivity. The model functions can be analyzed and user-modified on a tissue-by-tissue basis, thereby allowing modeling of a wide variety of normal and abnormal tissue attributes and corresponding study thereof. The model can be user-modified through a keyboard, or other VR tools such as a haptic interface. The haptic interface can modify the model to correspond to the tissue attributes of a user, and can provide sensory output corresponding to the interaction of the model to a prescripted scene. This prior art introduces the concept of producing realistic images, however, does not explain nor imply the present invention, i.e., the method of producing and displaying wrinkles on limbs of a human being.

U.S. Pat. No. 5,625,577 introduces a motion analyzing method which analyzes and displays motions of a human being or an animal using a computer in an interactive manner without requiring trial and error or without depending on intuition of an analyst. According to this prior art, a human body or an animal body is divided into a plurality of segments connected by joints, each of the segments acting as a minimal unit of motion. Data for modeling the human or animal body on the basis of physical constraints and the inherent nature of each of the segments is maintained in a database. Motions are input to be analyzed and the input motions are analyzed using inverse dynamics. The resultant movements and the center of gravity of each of the segments, the force and torque exerted on each of the joints, the movement and the center of gravity of the whole body, and the forces and torques exerted on the centers of gravity are superimposed on the human or animal body model of the database and are displayed on a screen. The new motions thus displayed can be used for the teaching of new skills in the industrial or performing arts, in sports, or in animal training. This prior art introduces the concept of producing realistic images, however, does not explain nor imply the present invention, i.e., the method of producing and displaying wrinkles on limbs of a human being.

U.S. Pat. No. 6,215,500 introduces methods and systems for compressing and decompressing 3-D geometry data which includes regularly tiled surface portions. According to this prior art, one compression method includes representing a surface portion as a "vertex raster", which comprises specifying an extent value and encoding the vertex parameter values of vertices within the surface portion. The extent of the surface portion specifies the arrangement of vertices within the surface portion, and allows the vertices to be properly assembled into drawing primitives during decompression. The encoded vertex parameter values may be encoded globally (by setting initial values and corresponding delta values), locally (on a per-vertex basis), or using a combination of these techniques. Absolute, delta encoding, or delta-delta encoding may be utilized for these parameter values. Vertex parameters which may be encoded in this manner include position, color, normals, z-displacement values, texture map coordinates, and surface material properties. Additionally, connectivity information may also be encoded using this compression method by specifying quad split bits and half-resolution edges. Quad split bits are used to tessellate a quadrilateral formed by neighboring vertices of a surface portion according to the direction of the strongest color change. Half-resolution edges are utilized to gradually shift from an area of high resolution to an adjacent surface portion represented in lower resolution. For graphical objects which include a plurality of adjacent surface portions, a step command is disclosed which allows data from one surface portion to be advantageously reused. Decompression of a vertex raster representation may comprise decoding the extent value, global parameter values, and a per-vertex stream of local parameter values. This prior art introduces the concept of producing realistic images, however, does not explain nor imply the present invention, i.e., the method of producing and displaying wrinkles on limbs of a human being.

U.S. Pat. No. 6,204,860 introduces a system that defines a wire curve deformation primitive with a free-form parametric curve associated with the closest points to the curve on a surface of a model. According to this prior art, the wire curve includes a radius influence defining the points on the object which will be deformed. A scale factor determines the amplitude of the scaling or point movement that is caused by the wire curve. A blending function of the wire curve defines the transition from the deformed regions to the undeformed regions of the object. The wire curve can have associated with it holder curves defining the domain of deformation about an object caused by one or more wires. A holder curve holds the points of the object in place. Locators are used to define different parameters values along the wire curve. Changes in parameter values around the locators are accomplished by interpolation. Deforming includes preprocessing steps as well as deformation stage operations. This prior art introduces the concept of producing realistic images, however, does not explain nor imply the present invention, i.e., the method of producing and displaying wrinkles on limbs of a human being.

U.S. Pat. No. 6,144,385 introduces a character animation system executing on a computer. According to this prior art, the system provides a simple, efficient and powerful user interface that allows the user to specify complex animations of multi-legged characters by placing footprints on a surface. A compiler automatically generates a natural looking animation based on the footprints. Motions such as walking, running, jumping, etc. are easily animated depending on the way footprints are placed. The user is able to create new footprint patterns and modify existing patterns. Footprint blocks on a timeline are used to specify the time duration that each foot is in contact with a footprint. The user may specify keyframes in the animation sequence that allow more complicated body movements to be incorporated with the footprint based animation. This prior art introduces the concept of producing realistic images, however, does not explain nor imply the present invention, i.e., the method of producing and displaying wrinkles on limbs of a human being.

U.S. Pat. No. 6,088,034 introduces a method and apparatus wherein three-dimensional compressed geometry is decompressed with a unit having an input FIFO receiving compressed data bits and outputting to an input block state machine and an input block, whose outputs are coupled to a barrel shifter unit. According to this prior art, input block output also is input to Huffman tables that output to the state machine. The state machine output also is coupled to a data path controller whose output is coupled to a tag decoder, and to a normal processor receiving output from the barrel shifter unit. The decompressor unit also includes a position/color processor that receives output from the barrel shifter unit. Outputs from the normal processor and position/color processor are multiplexed to a format converter. For instructions in the data stream that generate output to the format converter, the decompression unit generates a tag sent to the tag decoder in parallel with bits for normals that are sent to the format converter. The decompressed stream of triangle data may then be passed to a traditional rendering pipeline, where it can be processed in full floating point accuracy, and thereafter displayed or otherwise used. This prior art introduces the concept of producing realistic images, however, does not explain nor imply the present invention, i.e., the method of producing and displaying wrinkles on limbs of a human being.

U.S. Pat. No. 6,064,390 introduces an apparatus and method for representing expression in a tissue-like system that may include a human face, where the system is particularized to a specified individual. According to this prior art, a graphical representation generator implemented in a computer determines a representation, in terms of a finite-element model, of the surface of the tissue of the system, providing a graphic output defining the surface in world coordinates. An expressive detail generator, including a wrinkle generator, modifies the surface determined by the graphical representation generator before the surface has been mapped into world coordinates in accordance with three-dimensional features of the tissue-like system of a particular subject. This prior art introduces the concept of producing realistic images, however, does not explain nor imply the present invention, i.e., the method of producing and displaying wrinkles on limbs of a human being.

U.S. Pat. No. 5,850,222 introduces a computer system for displaying clothing on a rendered image of a human body referred to as a virtual dressing room system ("VDRS"). According to this prior art, the VDRS receives a series of contour lines defining the three-dimensional shape of the human body. A contour line is a series of points that defines the perimeter of the body in a horizontal plane. The VDRS also receives a sequence of points defining the two-dimensional shape of the clothing. The VDRS also scales the sequence of points defining the two-dimensional shape of the clothing to the approximate width of a portion of the human body over which the clothing is worn. For each point of the two-dimensional shape, the VDRS identifies a corresponding point on a contour line, and adjusts the point of the two-dimensional shape of the clothing to correspond to the identified point. The VDRS renders the shape of the human body on a display device, and lenders the scaled and adjusted two-dimensional shape of the clothing on the display device to effect the display of the human body wearing the clothing. This prior art introduces the concept of producing realistic images, however, does not explain nor imply the present invention, i.e., the method of producing and displaying wrinkles on limbs of a human being.

U.S. Pat. No. 5,802,220 introduces a system which tracks human head and facial features over time by analyzing a sequence of images. According to this prior art, the system provides descriptions of motion of both head and facial features between two image frames. These descriptions of motion are further analyzed by the system to recognize facial movement and expression. The system analyzes motion between two images using parameterized models of image motion. Initially, a first image in a sequence of images is segmented into a face region and a plurality of facial feature regions. A planar model is used to recover motion parameters that estimate motion between the segmented face region in the first image and a second image in the sequence of images. The second image is warped or shifted back towards the first image using the estimated motion parameters of the planar model, in order to model the facial features relative to the first image. An affine model and an affine model with curvature are used to recover motion parameters that estimate the image motion between the segmented facial feature regions and the warped second image. The recovered motion parameters of the facial feature regions represent the relative motions of the facial features between the first image and the warped image. The face region in the second image is tracked using the recovered motion parameters of the face region. The facial feature regions in the second image are tracked using both the recovered motion parameters for the face region and the motion parameters for the facial feature regions. The parameters describing the motion of the face and facial features are filtered to derive mid-level predicates that define facial gestures occurring between the two images. These mid-level predicates are evaluated over time to determine facial expression and gestures occurring in the image sequence. This prior art introduces the concept of producing realistic images, however, does not explain nor imply the present invention, i.e., the method of producing and displaying wrinkles on limbs of a human being.

U.S. Pat. No. 5,687,737 introduces an optimal electrophysiologic mapping system for map-directed arrhythmia surgery and cardiac research allows rapid and accurate interpretation of cardiac activation sequences. According to this prior art, the system can display activation or potential distribution data on an anatomically accurate 3-D model of the heart and allows fast, interactive control of viewing characteristics, including control of which cardiac surfaces are displayed, control of virtual lighting, rotational control of the displayed image, etc. The system employs two computer programs, GETPIC3 and MAP3, and runs on a Silicon Graphics workstation capable of rapid graphics calculations and displays. The system utilizes 3-D models of epicardial and endocardial surfaces created with the GETPIC3 program from a sequence of 2-D images of a heart. The individual surfaces are triangulated and may be smoothed using a spline function. The MAP3 program displays activation times either as static isochronous maps or as dynamic time-since-last-activation maps. In the latter case, surface color denotes the time elapsed since a particular area activated. Potential distribution data may also be displayed dynamically. A mouse allows the system operator to control real-time rotation of the model in three dimensions, and any surface can be hidden interactively for better viewing of the data. Control is also provided over the starting, stopping, reversing, and repeating of data, as well as over the frame rate for dynamic displays. This prior art introduces the concept of producing realistic images, however, does not explain nor imply the present invention, i.e., the method of producing and displaying wrinkles on limbs of a human being.

U.S. Pat. No. 5,504,845 introduces a three dimensional image of a solid form which is presented to an operator by means of a stereoscopic display. According to this prior art, the operator defines a panel on the surface of the form with a set of bounding seam lines. A polygonal mesh is generated between the seam lines and is manipulated in three dimensions by the operator to achieve a desired surface appearance, including wrinkles, folds, pleats and other details. Manipulation of the mesh is constrained by the mechanical properties of the surface material or fabric being modelled. Surface texture and shading are then mapped onto the mesh to fully render the surface appearance in three dimensions. This prior art introduces the concept of producing realistic images, however, does not explain nor imply the present invention, i.e., the method of producing and displaying wrinkles on limbs of a human being.

U.S. Pat. No. 5,267,154 introduces a biological image formation aiding system and a biological image forming method which are provided in which three-dimensional data corresponding to a standard shape of a biological article, standard motion thereof, and a standard material feeling of an outer surface of the biological article are prepared, and a realistic three-dimensional synthesized image of an entire biological article with individuality can be formed simply. According to this prior art, the system includes a shape data storage for storing data corresponding to a three-dimensional shape of a biological image; a motion data storage for storing data corresponding to three-dimensional motion of the biological image, a material feeling data storage for storing data corresponding to a three-dimensional material feeling of an outer surface of the biological image; editing/processing units capable of modifying at least one of the data corresponding to the three-dimensional shape of the biological image, the three-dimensional data corresponding to the motion of the biological image, and the data corresponding to the three-dimensional material feeling of the outer surface of the biological image in accordance with a producer's intent; and an output unit responsive to the outputs of the editing/processing unit for synthesizing the data corresponding to the three-dimensional biological image, the data corresponding to the three-dimensional motion of the biological image, and the data corresponding to the three-dimensional material feeling of the outer surface of the biological image after modification with each other to provide synthesized three-dimensional data for a biological image to be produced. This prior art introduces the concept of producing realistic images, however, does not explain nor imply the present invention, i.e., the method of producing and displaying wrinkles on limbs of a human being.

U.S. Pat. No. 6,326,967 introduces an image creating apparatus which displays a plurality of identical game-element images in predetermined colors on an image display unit by pasting textures on polygons provided in a virtual three-dimensional space. According to this prior art, the image creating apparatus includes a polygon-data storage unit for storing the coordinates of N (integer not less than 2) sets of polygons constituting the element images so that N game elements are arranged and displayed on the display unit; a texture-selection-data storage unit for selecting one set of the textures which corresponds to one of the characters; a color-data storage unit for storing, as a basic color, a first color determined for the one set of the textures; a color-data setting unit for setting a second color; and a composite-color setting unit for setting composite colors for the textures to be pasted on N sets of polygons, the composite colors being obtained by mixing the first color and the second color at different ratios. This prior art introduces the concept of producing realistic images, however, does not explain nor imply the present invention, i.e., the method of producing and displaying wrinkles on limbs of a human being.

U.S. Pat. No. 6,322,448 introduces a image processing device for games which is a device whereby a prescribed number of models (characters) are set up in virtual space, these models are controlled such that they move in prescribed directions in the virtual space, and images of this virtual space from a virtual viewpoint are displayed on means for display. According to this prior art, in order to display the movement of the models that are arranged in virtual space more realistically, in one construction thereof, this device is provided with means for image processing that apply virtual centripetal force to the models. Furthermore, in order to display the movement of the models more realistically and to heighten the dramatic effect, in one construction thereof, this device is equipped with means for processing residual image presentation in order to represent the track of movement of a model as residual images. This means for processing is equipped with means for storage that store without modification motion data of the model prior to the current motion and with means for display control that display this stored data together with the current motion data. This prior art introduces the concept of producing realistic images, however, does not explain nor imply the present invention, i.e., the method of producing and displaying wrinkles on limbs of a human being.

U.S. Pat. No. 6,320,988 introduces a method of transforming the shape of a skeleton model, wherein this method can easily handle a skeleton model of a multiple-branching structure and enables the easy setting of complicated restrictive conditions. According to this prior art, node coordinates and arc-normal vectors are used as basic variables. Basic equations, which comprise an equation defining the length of an arc and which use basic variables as unknowns, and an evaluation expression for uniquely specifying a solution that satisfies these basic equations are modified, based on data such as mouse input. A solution for the basic variables that satisfies the basic equations and minimizes the value of the evaluation expression is obtained, and the shape of the skeleton model is transformed accordingly. The evaluation expression is used to set minimization of the sum-of-squares of arc-to-arc angles, rubber-banding, dampers, and inertia. The basic equations and the evaluation expression are updated in synchronization with the end of a loop. A spring restriction can be set, and the use of a restrictive condition in the next loop of the calculations can be determined from whether or not the restrictive condition was used in the previous loop, and whether or not an object has passed a boundary. This prior art introduces the concept of producing realistic images, however, does not explain nor imply the present invention, i.e., the method of producing and displaying wrinkles on limbs of a human being.

SUMMARY OF INVENTION

It is an object of the present invention to provide a method of producing and displaying wrinkles on limbs of a human being.

Still another object is to overcome the aforementioned shortcomings associated with the prior art.

Further objects, features, and advantages of the present invention over the prior art will become apparent from the detailed description which follows, when considered with the attached figures.

The present invention introduces a wrinkle simulation software for displaying a human being comprised of a plurality of arm joints, wherein each of the plurality of arm joints comprises a 1st part and a 2nd part. The invention also displays one or more wrinkles on or near the joint of the 1st part and the 2nd part, wherein the 1st part and the 2nd part are connected, and the angle produced by the 1st part and 2nd part is variable. The more the value of the angle decreases, the more the amount and/or the height of the wrinkle increases, thereby enabling the wrinkle simulation software to display the movement of the human being and the movement of the 1st and the 2nd part in a realistic manner.

The present invention further introduces a muscle movement simulation software for displaying a human being comprised of a plurality of arm joints, wherein each of the plurality of arm joints comprises a 1st part and a 2nd part. The 1st part and the 2nd part are connected, and the angle produced by the 1st part and 2nd part is variable. The more the value of the angle decreases, the more the thickness of the 1st part increases, thereby enabling the muscle movement simulation software to display the movement of the human being and the movement of the 1st and the 2nd part in a realistic manner.

BRIEF DESCRIPTION OF DRAWINGS

The above and other aspects, features, and advantages of the invention will be better understood by reading the following more particular description of the invention, presented in conjunction with the following drawings, wherein:

FIG. 8 is a simplified illustration of the content included in the RAM illustrated in FIG. 7.

FIG. 14 is a simplified illustration of the content included in the RAM illustrated in FIG. 13.

FIGS. 15a through 15e are simplified illustrations of the methods to display a wrinkle on the monitor.

FIGS. 18a through 18e are simplified illustrations of the methods to display the arm on the monitor.

FIG. 20 is a simplified illustration of the content included in the RAM illustrated in FIG. 20.

FIGS. 21a through 21e are simplified illustrations of the methods to display the arm on the monitor.

FIG. 22 is a simplified illustration of the area included in the RAM.

FIG. 23 is a flowchart illustrating the operation of the wrinkle generating software.

FIGS. 24a through 24e are simplified illustrations of the methods to display the arm on the monitor.

FIG. 29 is a simplified illustration of the data stored in the RAM.

DETAILED DESCRIPTION

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1A:
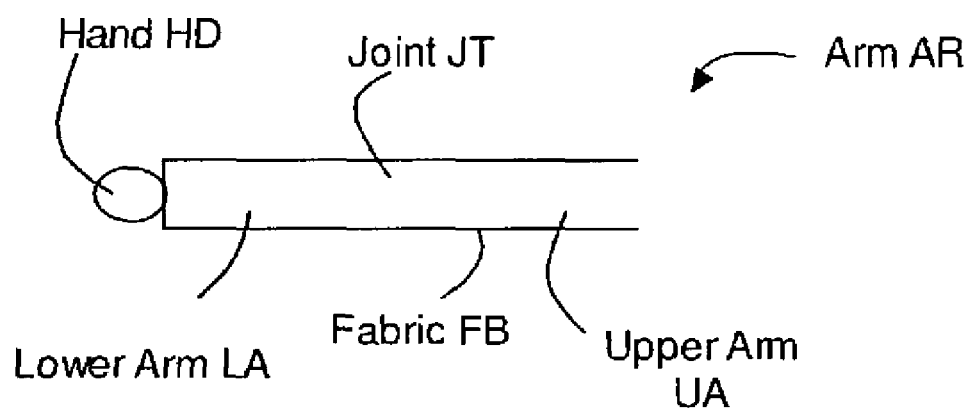
FIGS. 1a and 1b are simplified illustrations illustrating the methods to display the arm of a human being by utilizing the prior art.
Figure 1B:
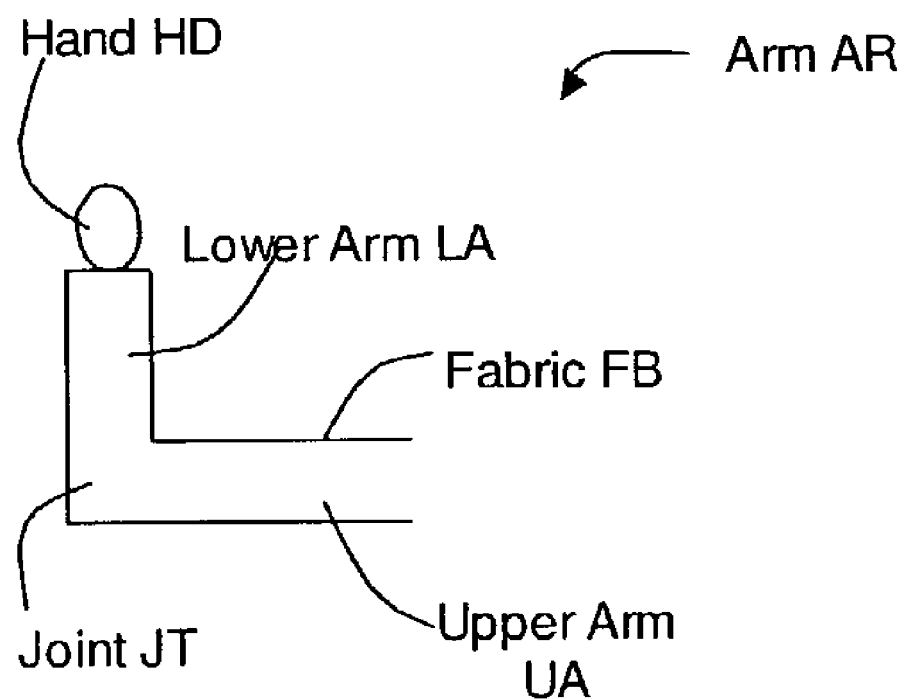
Figure 2:
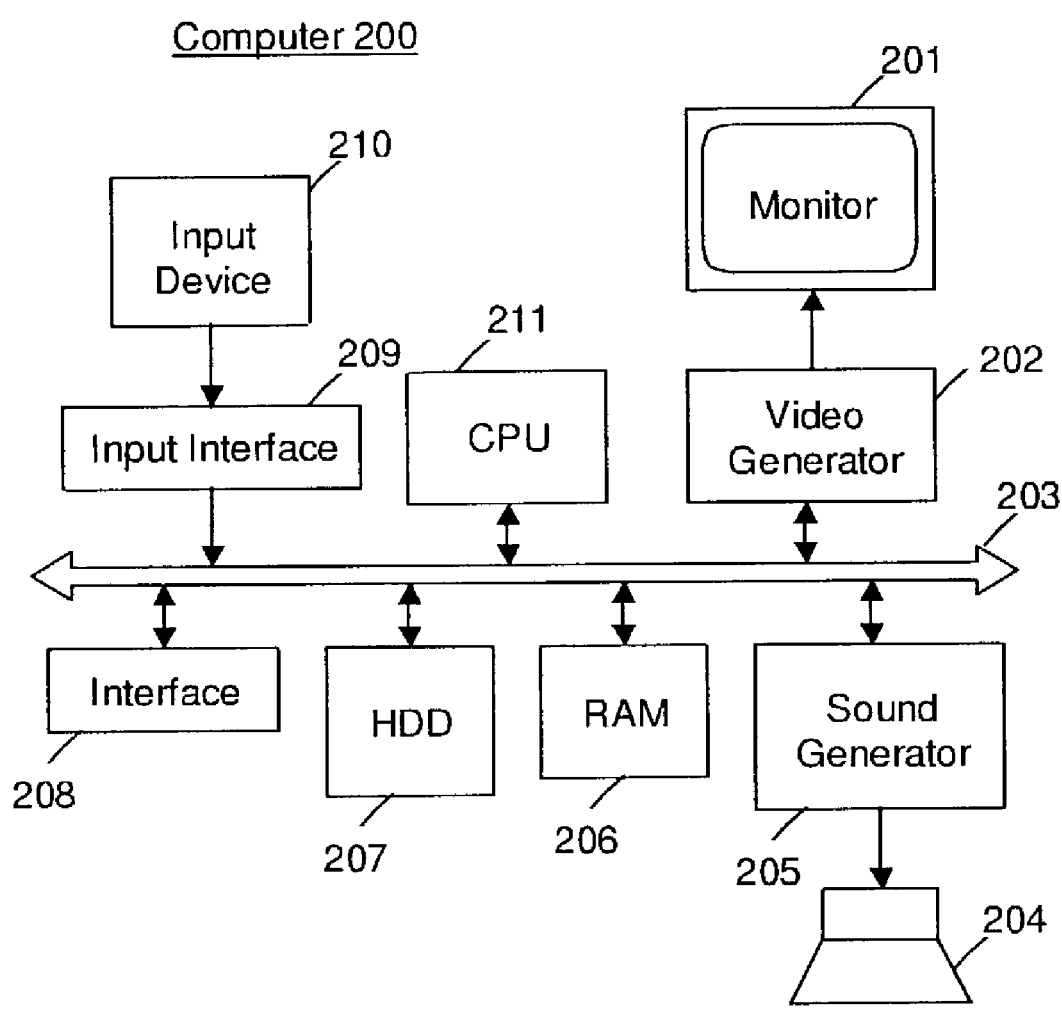
FIG. 2 is a block diagram illustration of the computer which performs the present invention.

FIG. 2 illustrates the details of computer 200 which performs the present invention. CPU 211 controls and administers the overall function and operation of computer 200. CPU 211 uses RAM 206 to temporarily store data and/or to perform calculation to perform its function. Video generator 202 generates analogue and/or digital video signals which are displayed on monitor 201. Sound generator 205 generates analogue and/or digital audio signals which are transferred to speaker 204. HDD 207 stores data and/or programs which are necessary to perform the present invention. Interface 208 is an interface between computer 200 and a server which enables computer 200 to send and receive digital data with the server. Input signals are input by input device 210, such as keyboard and joystick, and the signals are transferred via input interface 209 and data bus 203 to CPU 211. Computer 200 can have the same or similar structure to the computers which are described in FIG. 1 of U.S. Pat. No. 5,870,101, FIG. 2 of U.S. Pat. No. 6,157,384, FIG. 1 of U.S. Pat. No. 5,774,125, FIG. 1 of U.S. Pat. No. 5,375,206, and/or FIG. 1 of U.S. Pat. No. 5,925,127. Overall, computer 200 has the capability of displaying three-dimensional objects on monitor 201 by utilizing the texture mapping method or polygon method. Video Generator 202 is used for displaying the three-dimensional objects.

Figure 3:
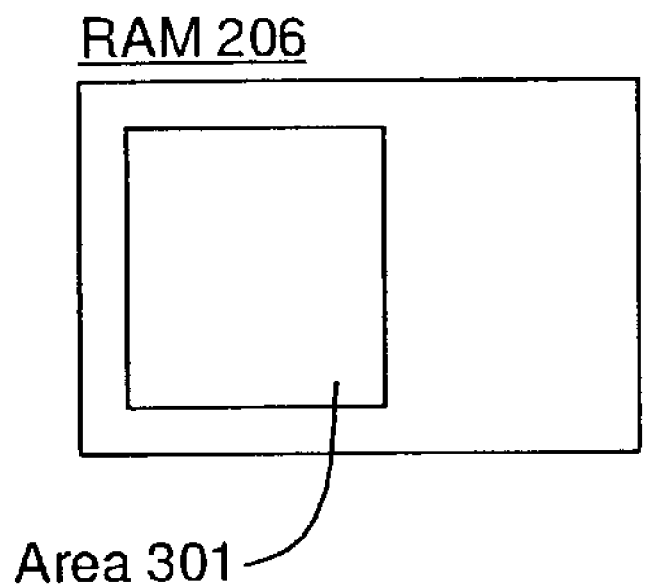
FIG. 3 is a simplified illustration of the area included in the RAM.

As illustrated in FIG. 3, RAM 206 (FIG. 2) includes area 301. Area 301 stores a wrinkle generating software which is designated to generate wrinkles as described in details hereinafter.

Figure 4:
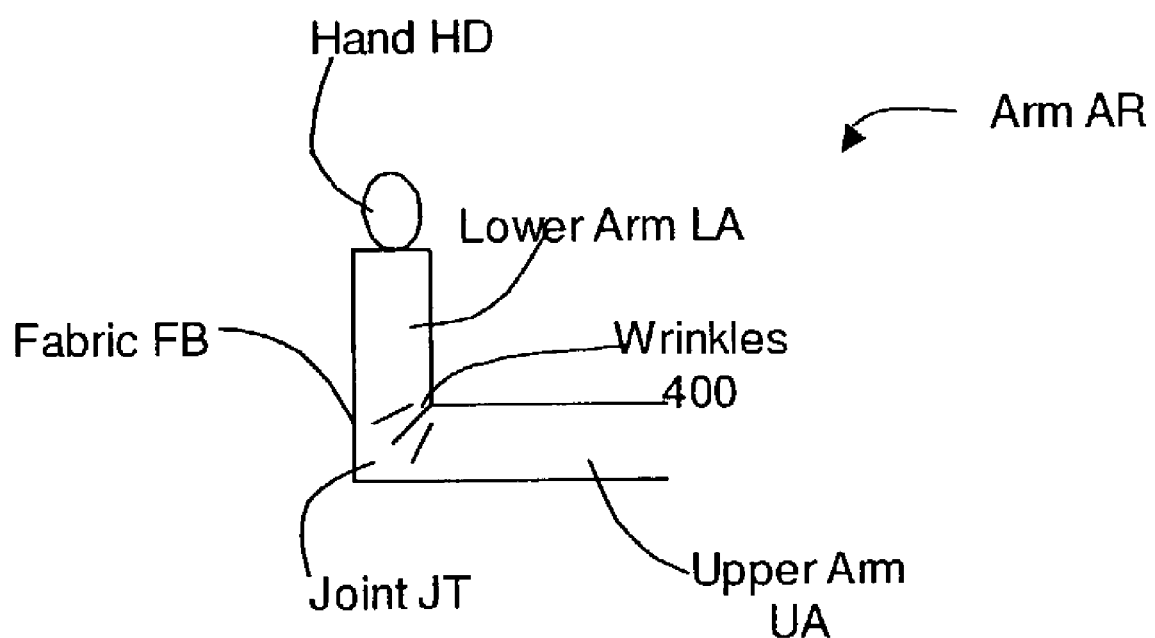
FIG. 4 is a simplified illustration illustrating the concept of the present invention.

FIG. 4 illustrates the concept of the present invention. As described in FIG. 4, arm AR of an object (a human being) consists of hand HD, lower arm LA, joint JT, and upper arm UA. Assuming that arm UA is covered by fabric FB, i.e., the object is wearing a suit of clothes which covers his/her arms. When arm AR is bent, wrinkles 400 is generated on or near joint JT by the wrinkle generating software stored in area 301 (FIG. 3) of RAM 206 (FIG. 2).

Figure 5:
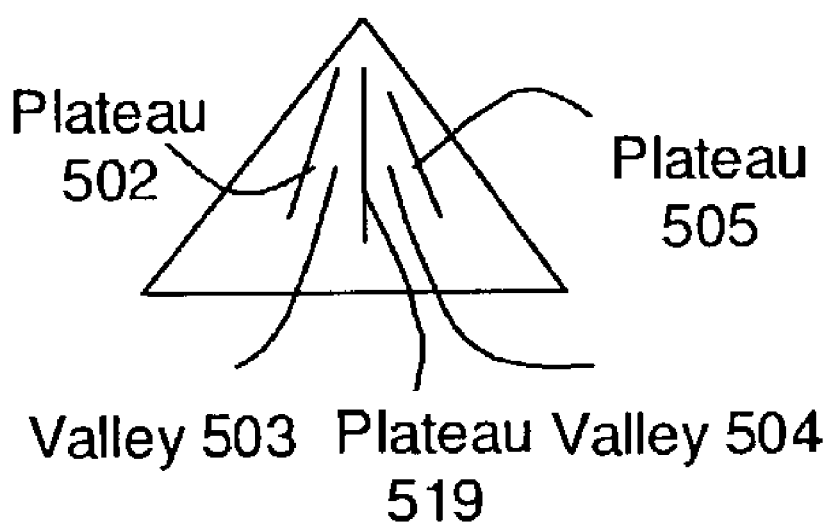
FIG. 5 is a simplified illustration illustrating one method of generating wrinkles.

FIG. 5 illustrates the method of generating wrinkles. The most convenient way to generate wrinkles is to paste a texture describing wrinkles on a piece of polygon by the method so-called the "texture mapping." The details of such method are explained in the patents described hereinbefore. The method of "texture mapping" is not explained in this patent specification in details since such method itself is not the object of the present invention. As illustrated in FIG. 5, texture 501 which is applied on or near joint JT (FIG. 4) has a pattern consisting of a plurality of plateaus and valleys. Plateaus 502, 519, and 505 represent the highest portion of the wrinkles displayed and valley 503 and 504 represent the space between the wrinkles. For purposes of designing texture 501, plateaus 502, 519, and 505 are displayed with lighter colors, and valley 503 and 504 are displayed with darker colors compared to these plateaus.

Figure 6:
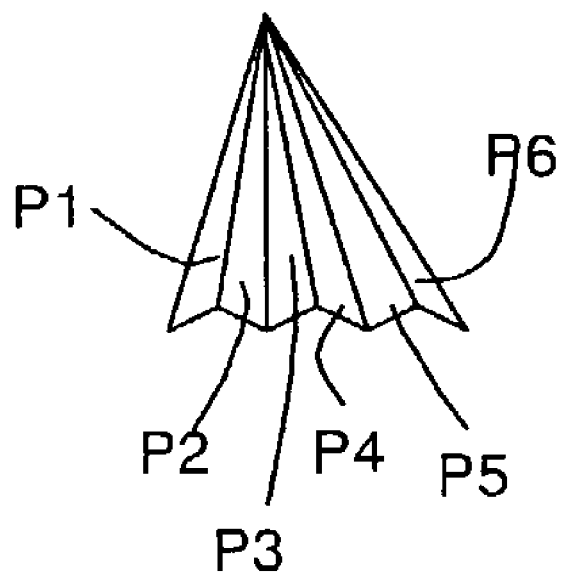
FIG. 6 is a simplified illustration illustrating another method of generating wrinkles.

FIG. 6 illustrates another method of generating wrinkles. A plurality of polygons in this embodiment are used to generate wrinkles. Namely, polygons P1 and P2, P3 and P4, and P5 and P6 represent a wrinkle respectively. More precisely, the connected portion of polygons P1 and P2 represents plateau 502, the connected portion of polygons P2 and P3 represents valley 503, the connected portion of polygons P3 and P4 represents plateau 519, the connected portion of polygons P4 and P5 represents valley 504, and the connected portion of polygons P5 and P6 represents plateau 505 in FIG. 5.

FIG. 7 through FIG. 12d illustrate the method of determining the amount of wrinkles that should be displayed on monitor 201 (FIG. 2).

Figure 7:
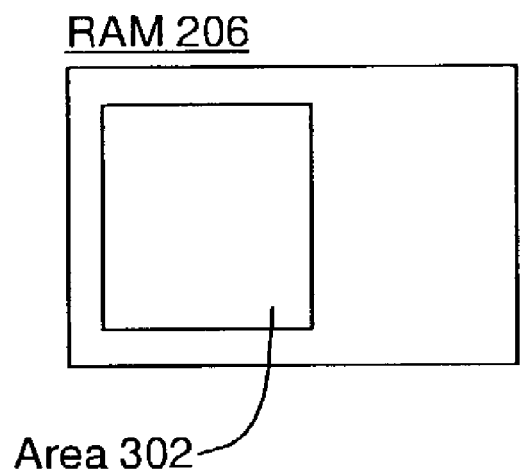
FIG. 7 is a simplified illustration of the area included in the RAM.
Figure 9A:
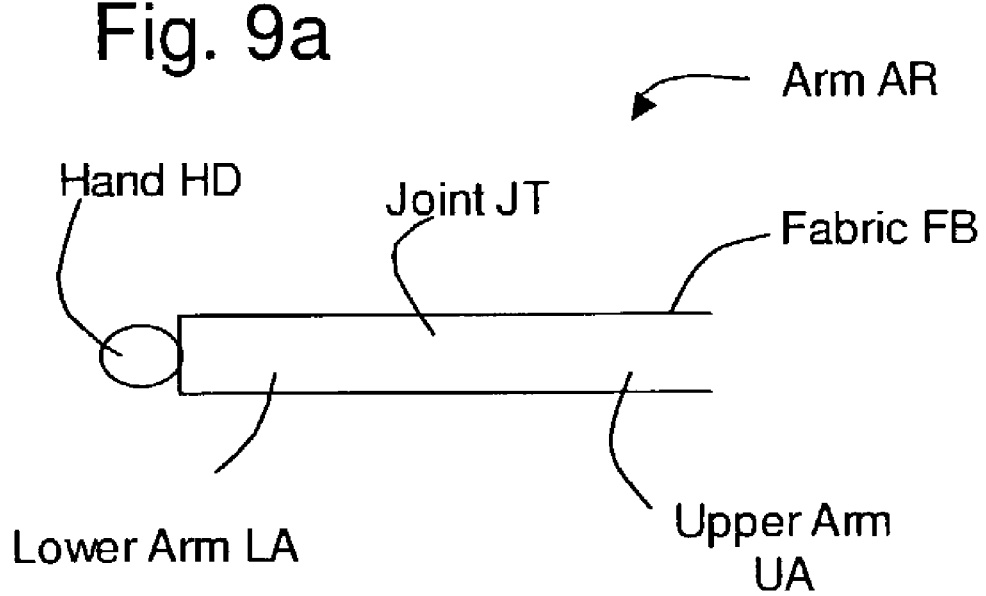
FIGS. 9a through 9e are simplified illustrations of the methods to display the arm on the monitor.
Figure 9B:
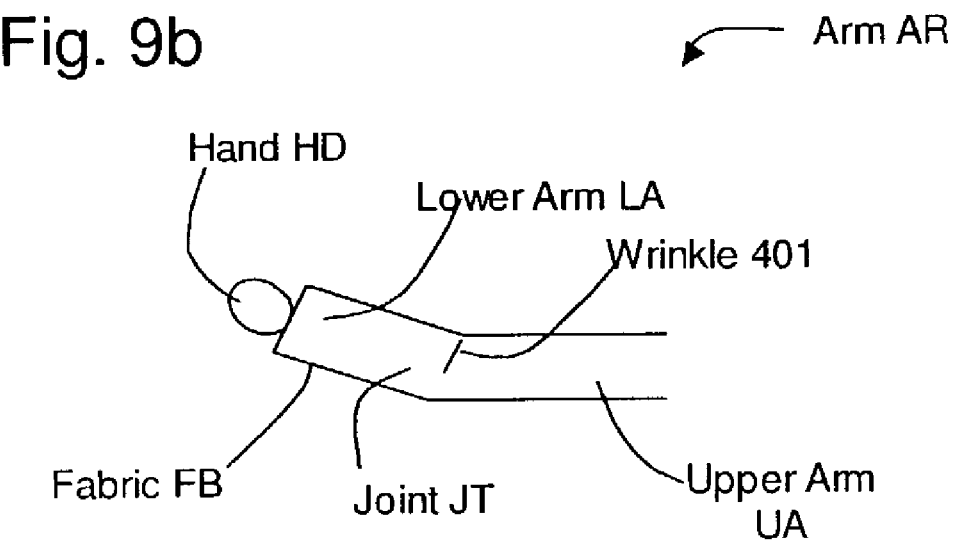
Figure 9C:
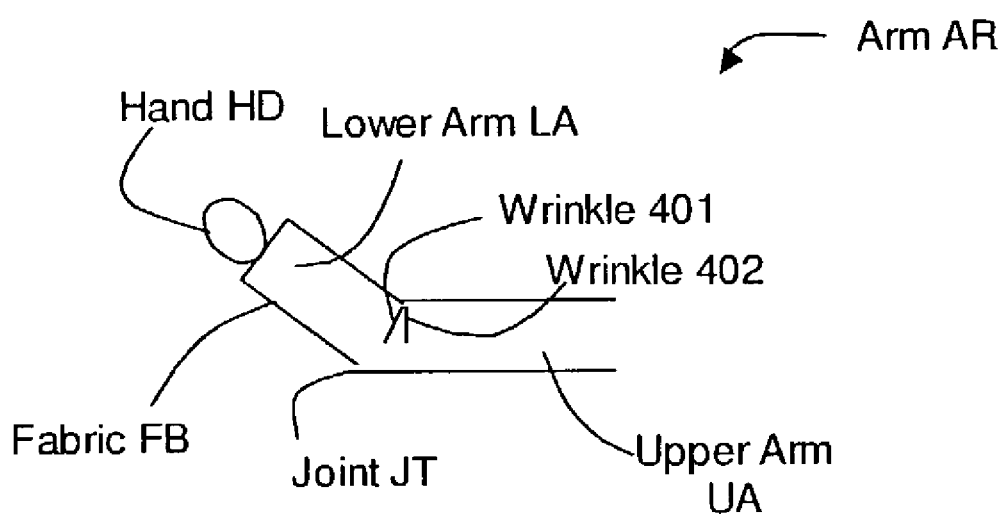
Figure 9D:
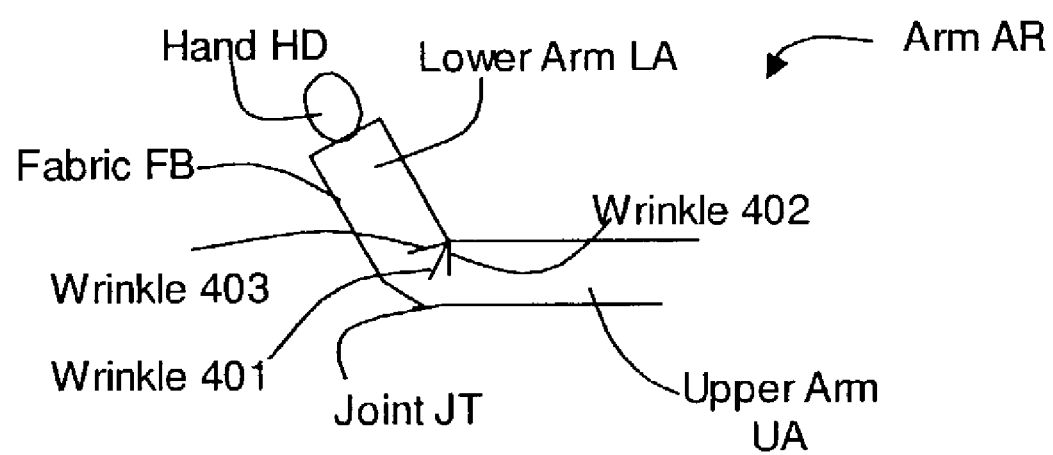
Figure 9E:
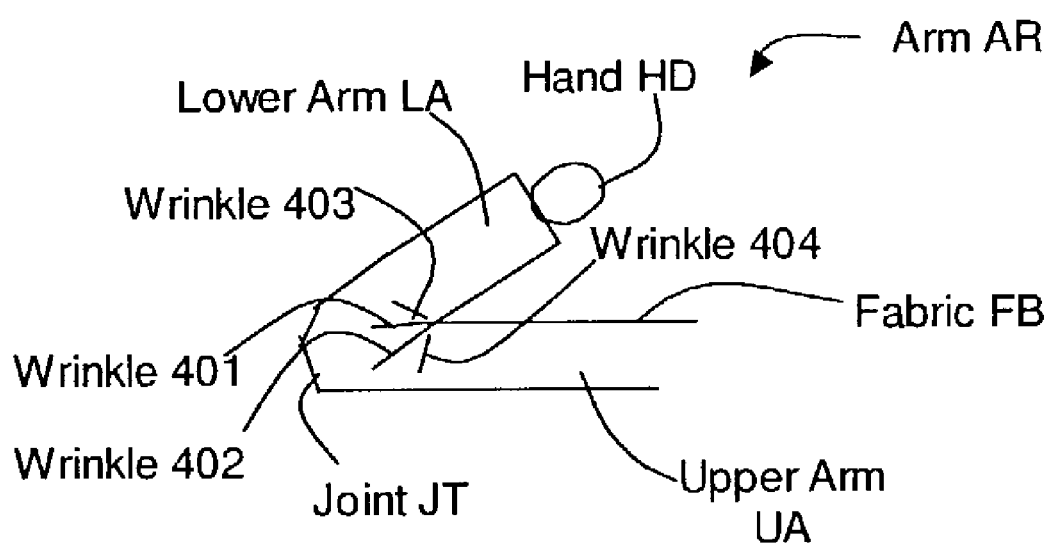

As illustrated in FIG. 7, RAM 206 (FIG. 2) includes area 302. Area 302 stores a plurality of data which are necessary to produce a plurality of wrinkles.

FIG. 8 illustrates the content of area 302 (FIG. 7) of RAM 206 (FIG. 2). Area 302 includes two types of data, i.e., the data representing the angle of joint JT (FIG. 4) produced by upper arm UA (FIG. 4) and lower arm LA (FIG. 4), and the data representing the amount of wrinkles displayed. In the example described in FIG. 8, the amount of wrinkles displayed is 0 when the angle of joint JT produced by upper arm UA and lower arm LA is 180 degrees. However, the amount of wrinkles increases as the angle of joint JT produced by upper arm UA and lower arm LA decreases. In the present example, the amount of wrinkle displayed is 1 when the angle is at least 160 degrees or more, but less than 180 degrees; the amount of wrinkles displayed is 2 when the angle is at least 135 degrees or more, but less than 160 degrees; the amount of wrinkles displayed is 3 when the angle is at least 110 degrees or more, but less than 135 degrees; and the amount of wrinkles displayed is 4 when the angle is at least 20 degrees or more, but less than 110 degrees.

FIG. 9a through FIG. 9e illustrate how arm AR is displayed on monitor 201 (FIG. 2) in accordance with the data stored in area 302 (FIG. 7) of RAM 206 (FIG. 2). Assuming that arm AR is covered with fabric FB. When arm AR is stretched as described in FIG. 9a and the angle of joint JT (FIG. 4) produced by lower arm LA and upper arm UA is 180 degrees, no wrinkles are shown on or near joint JT. As described in FIG. 9b, when arm AR is slightly bent and the angle of joint JT produced by lower arm LA and upper arm UA is at least 160 degrees or more, but less than 180 degrees, one wrinkle, i.e., wrinkle 401 is displayed on or near joint JT. As described in FIG. 9c, when arm AR is further bent and the angle of joint JT produced by lower arm LA and upper arm UA is at least 135 degrees or more, but less than 160 degrees, two wrinkles, i.e., wrinkles 401 and 402 are displayed on or near joint JT. As described in FIG. 9d, when the angle of joint JT produced by lower arm LA and upper arm UA is at least 110 degrees or more, but less than 135 degrees, three wrinkles, i.e., wrinkles 401, 402, and 403 are displayed on or near joint JT. As described in FIG. 9e, when the angle of joint JT produced by lower arm LA and upper arm UA is at least 20 degrees or more, but less than 110 degrees, four wrinkles, i.e., wrinkles 401, 402, 403, and 404 are displayed on or near joint JT.

Figure 10:
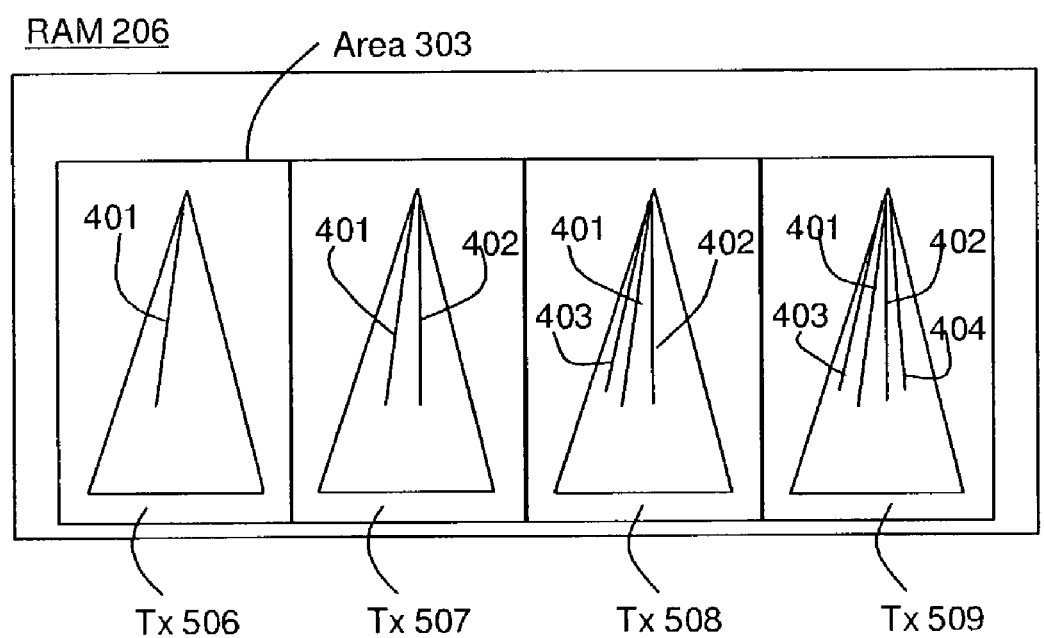
FIG. 10 is a simplified illustration of the area included in the RAM.

FIG. 10 illustrates a plurality of texture utilized to display wrinkles on monitor 201 (FIG. 2). As illustrated in FIG. 10, RAM 206 (FIG. 2) includes area 303. Area 303 stores a plurality of textures which are pasted on polygons, i.e., textures Tx 506, Tx 507, Tx 508, and Tx 509. Tx 506 includes one wrinkle, i.e., wrinkle 401 illustrated in FIG. 9b; Tx 507 includes two wrinkles, i.e., wrinkles 401 and 402 illustrated in FIG. 9c; Tx 508 includes three wrinkles, i.e., wrinkles 401, 402, and 403 illustrated in FIG. 9d; and Tx 509 includes four wrinkles, i.e., wrinkles 401, 402, 403, and 404 illustrated in FIG. 9e.

Figure 11:
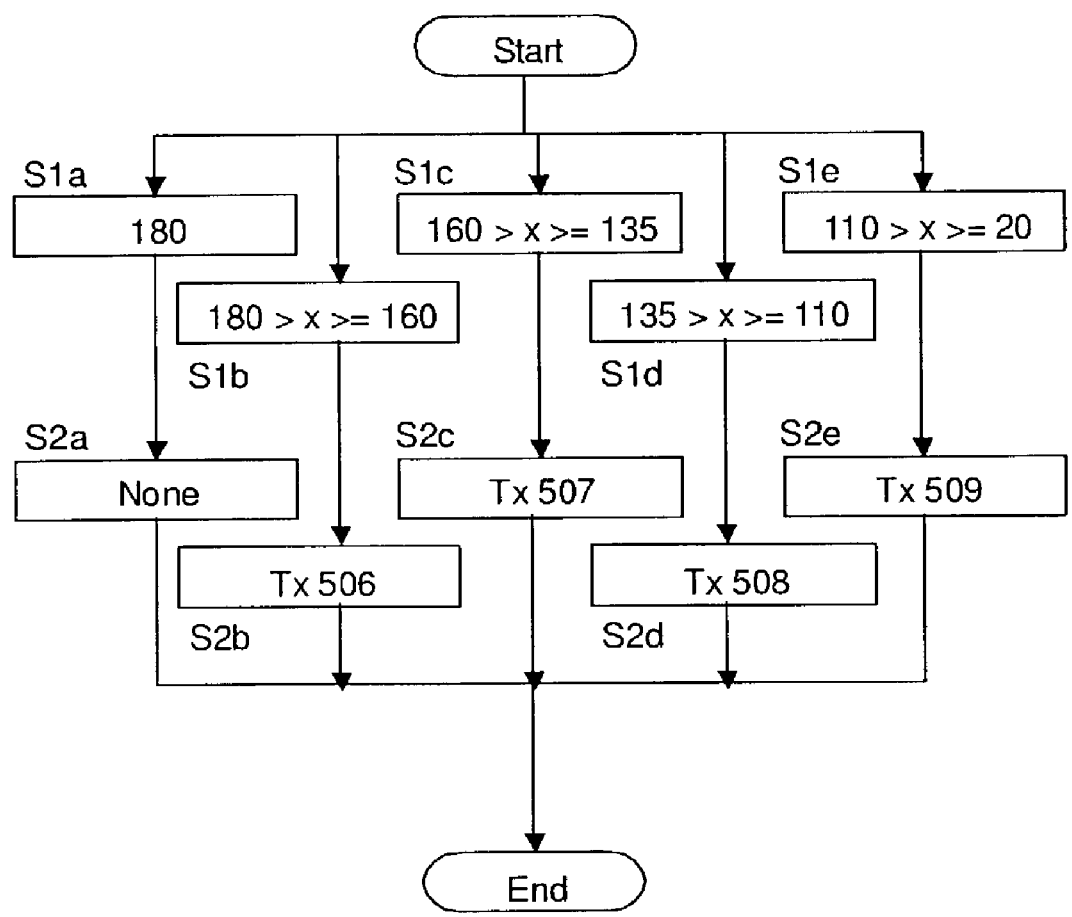
FIG. 11 is a flowchart illustrating the operation of the wrinkle generating software.

FIG. 11 illustrates the operation of the wrinkle generating software stored in area 301 (FIG. 3) of RAM 206 (FIG. 2). First of all, CPU 211 (FIG. 2) calculates the angle of joint JT produced by lower arm LA and upper arm UA. If the angle is 180 degrees (S1a), CPU 211 does not access area 303 (FIG. 10) of RAM 206 (S2a). If the angle is at least 160 degrees or more, but less than 180 degrees (S1b), CPU 211 retrieves Tx 506 from area 303 of RAM 206 (S2b). In the same manner, if the angle is at least 135 degrees or more, but less than 160 degrees (S1c), CPU 211 retrieves Tx 507 from area 303 of RAM 206 (S2c); if the angle is at least 110 degrees or more, but less than 135 degrees (S1d), CPU 211 retrieves Tx 508 from area 303 of RAM 206 (S2d); and if the angle is at least 20 degrees or more, but less than 110 degrees (S1e), CPU 211 retrieves Tx 509 from area 303 of RAM 206 (S2e).

Figure 12A:
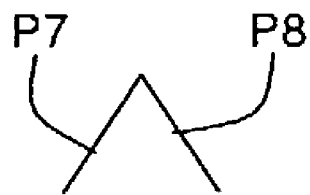
FIGS. 12a through 12d are simplified illustrations of exemplary embodiments to produce wrinkles.
Figure 12B:
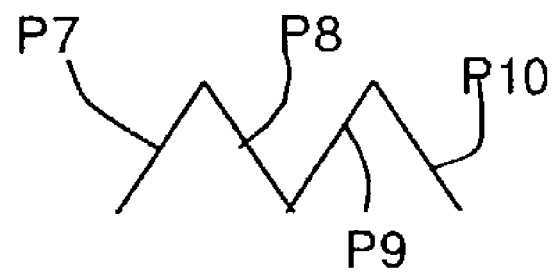
Figure 12C:
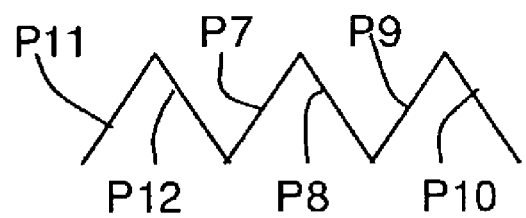
Figure 12D:
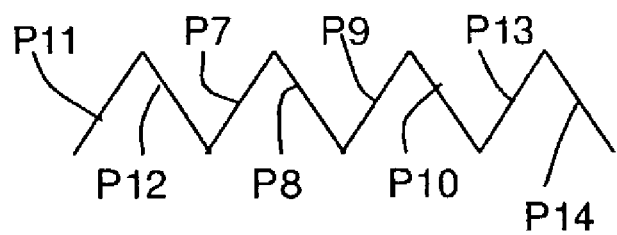

Instead of pasting textures to polygons in order to display wrinkles, a plurality of polygons may be used to produce wrinkles as described in FIG. 12a through FIG. 12d. One wrinkle can be produced by one set of two polygons, i.e., P7 and P8 as described in FIG. 12a. Two wrinkles can be produced by two sets of two polygons, i.e., P7 and P8, and P9 and P10 as described in FIG. 12b. Three wrinkles can be produced by three sets of two polygons, i.e., P7 and P8, P9 and P10, and P11 and P12 as described in FIG. 12c. Four wrinkles can be produced by four sets of two polygons, i.e., P7 and P8, P9 and P10, P11 and P12, and P13 and P14 as described in FIG. 12d. The operation of the wrinkle generating software stored in area 301 (FIG. 3) of RAM 206 (FIG. 2) in this embodiment is similar to the one described in FIG. 11. Such operation is not shown in the drawings. First of all, CPU 211 (FIG. 2) calculates the angle of joint JT produced by lower arm LA and upper arm UA. If the angle is 180 degrees, CPU 211 does not produce any wrinkles by polygons. If the angle is at least 160 degrees or more, but less than 180 degrees, CPU 211 produces polygons P7 and P8 to display one wrinkle as illustrated in FIG. 12a. In the same manner, if the angle is at least 135 degrees or more, but less than 160 degrees, CPU 211 produces polygons P7, P8, P9, and P10 to display two wrinkles as illustrated in FIG. 12b; if the angle is at least 110 degrees or more, but less than 135 degrees, CPU 211 produces polygons P7, P8, P9, P10, P11, and P12 to display three wrinkles as illustrated in FIG. 12c; and if the angle is at least 20 degrees or more, but less than 110 degrees, CPU 211 produces polygons P7, P8, P9, P10, P11, P12, P13, and P14 to display four wrinkles as illustrated in FIG. 12d.

FIG. 13 through FIG. 18d illustrate the method of determining the height of the wrinkles that should be displayed on monitor 201 (FIG. 2).

Figure 13:
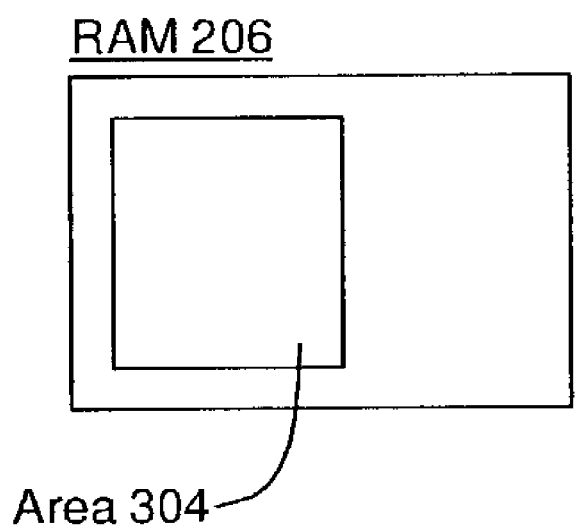
FIG. 13 is a simplified illustration of the area included in the RAM.

As illustrated in FIG. 13, RAM 206 (FIG. 2) includes area 304. Area 304 stores a plurality of data which are necessary to determine the height of the wrinkles.

FIG. 14 illustrates the content of area 304 (FIG. 13) of RAM 206 (FIG. 2). As illustrated in FIG. 14, area 304 includes two types of data, i.e., the data representing the angle of joint JT (FIG. 4) produced by upper arm UA (FIG. 4) and lower arm LA (FIG. 4), and the data representing the height of wrinkles displayed. For example, the height of the wrinkle displayed is 0 when the angle of joint JT produced by upper arm UA and lower arm LA is 180 degrees. However, the height of the wrinkle increases as the angle of joint JT produced by upper arm UA and lower arm LA decreases. In the example explained in FIG. 14, the height of the wrinkle displayed is 1 when the angle is at least 160 degrees or more, but less than 180 degrees; the height of the wrinkle displayed is 2 when the angle is at least 135 degrees or more, but less than 160 degrees; the height of the wrinkle displayed is 3 when the angle is at least 110 degrees or more, but less than 135 degrees; and the height of the wrinkle displayed is 4 when the angle is at least 20 degrees or more, but less than 110 degrees.

Figure 15B:
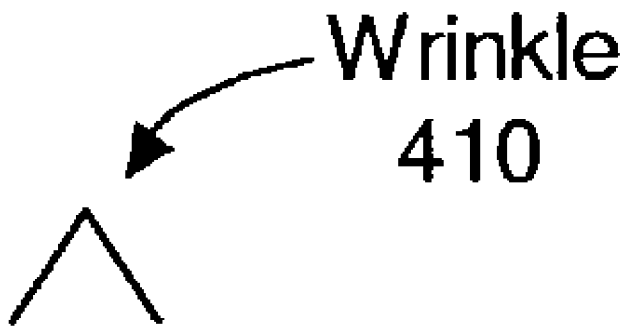
Figure 15D:
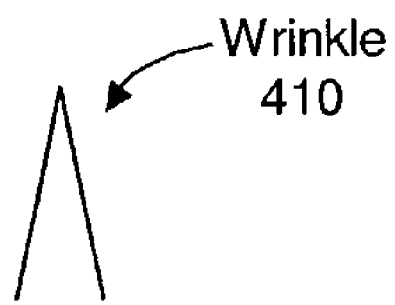
Figure 15E:
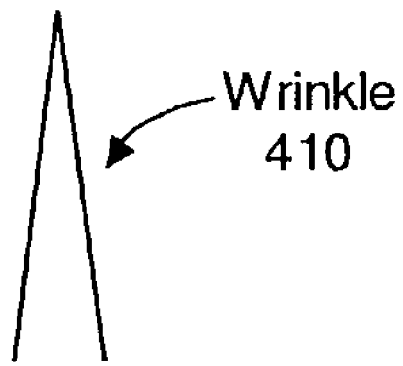

FIG. 15a through FIG. 15e illustrate how arm AR is displayed on monitor 201 (FIG. 2) in accordance with the data stored in area 304 (FIG. 14) of RAM 206 (FIG. 13). Assuming that arm AR is covered with fabric FB. When arm AR is stretched as described in FIG. 15a and the angle of joint JT produced by lower arm LA and upper arm UA is 180 degrees, no wrinkles are shown on or near joint JT. As illustrated in FIG. 15b, when arm AR is slightly bent and the angle of joint JT produced by lower arm LA and upper arm UA is at least 160 degrees or more, but less than 180 degrees, a small wrinkle, i.e., wrinkle 410 is displayed on monitor 201. As illustrated in FIG. 15c, when arm AR is further bent and the angle of joint JT produced by lower arm LA and upper arm UA is at least 135 degrees or more, but less than 160 degrees, a wrinkle larger than the one described in FIG. 15b is displayed on monitor 201. As illustrated in FIG. 15d, when the angle of joint JT produced by lower arm LA and upper arm UA is at least 110 degrees or more, but less than 135 degrees, a wrinkle larger than the one described in FIG. 15c is displayed on monitor 201. As illustrated in FIG. 15e, when the angle of joint JT produced by lower arm LA and upper arm UA is at least 20 degrees or more, but less than 110 degrees, a wrinkle larger than the one described in FIG. 15d is displayed on monitor 201.

Figure 16:
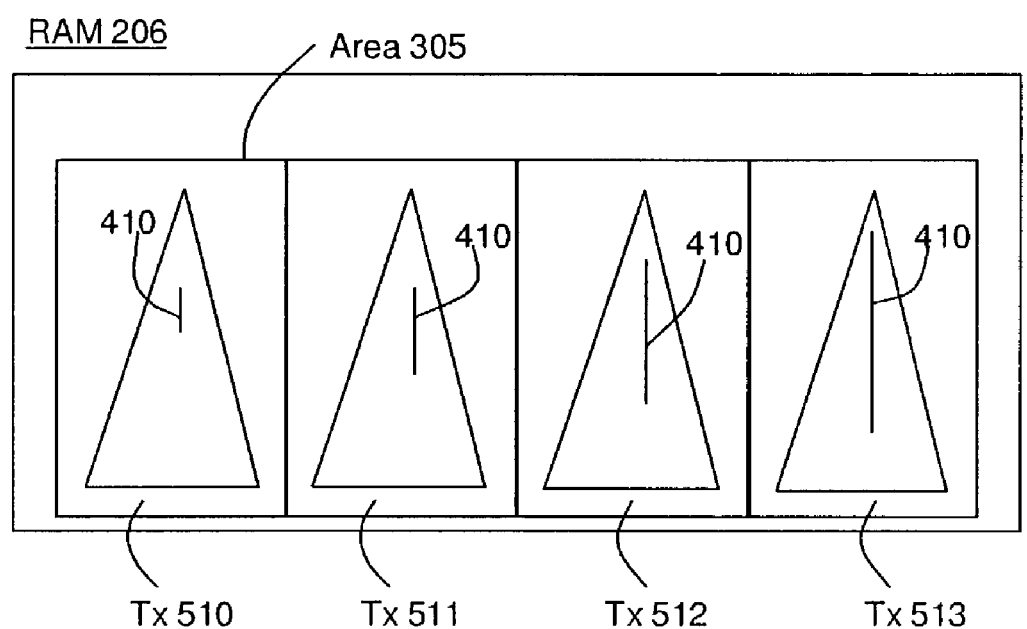
FIG. 16 is a simplified illustration of the area included in the RAM.

FIG. 16 illustrates a plurality of textures utilized to display wrinkles on monitor 201 (FIG. 2). As illustrated in FIG. 16, RAM 206 (FIG. 2) includes area 305. Area 305 stores a plurality of textures which are pasted on polygons, i.e., textures Tx 510, Tx 511, Tx 512, and Tx 513. Tx 510 includes the image of wrinkle 410 illustrated in FIG. 15b; Tx 511 includes the image of a larger wrinkle 410 illustrated in FIG. 15c; Tx 512 includes the image of wrinkle 410 illustrated in FIG. 15d; and Tx 513 includes the image of wrinkle 410 illustrated in FIG. 15e.

Figure 17:
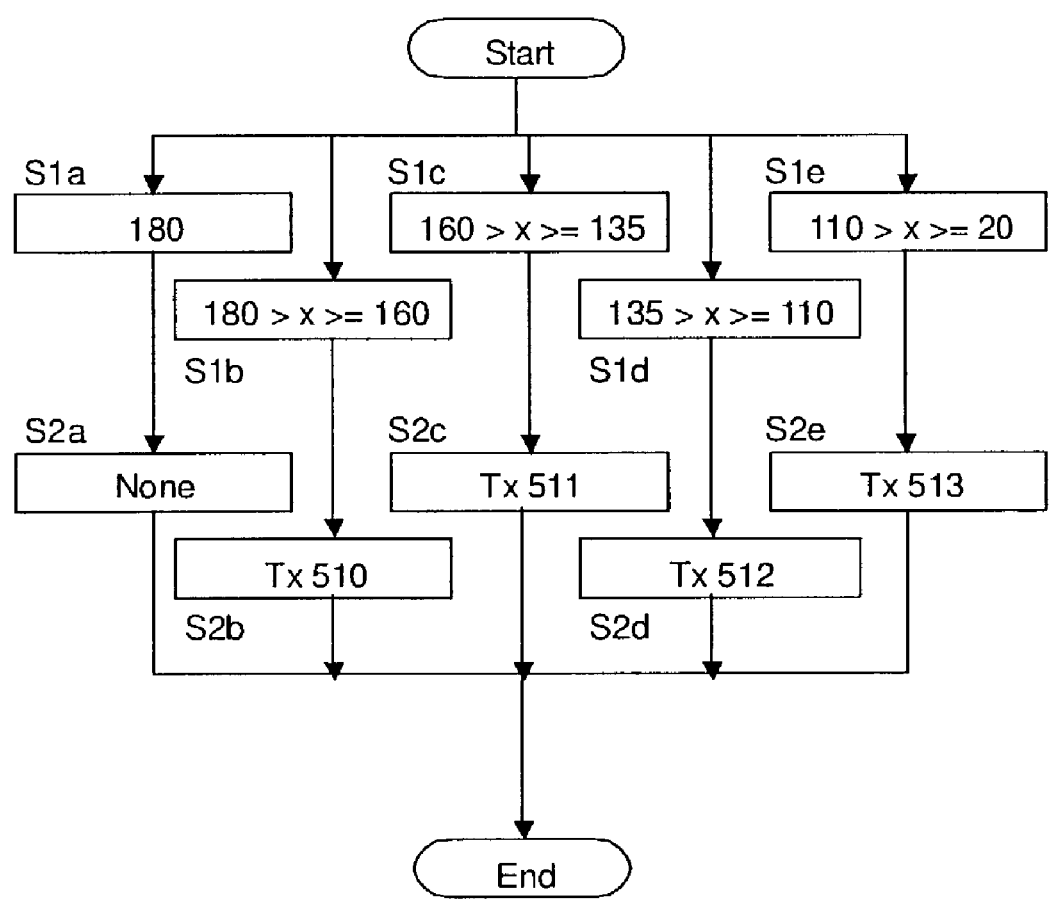
FIG. 17 is a flowchart illustrating the operation of the wrinkle generating software.

FIG. 17 illustrates the operation of wrinkle generating software stored in area 301 (FIG. 3) of RAM 206 (FIG. 2). First of all, CPU 211 (FIG. 2) calculates the angle of joint JT produced by lower arm LA and upper arm UA. If the angle is 180 degrees (S1a), CPU 211 does not access area 305 (FIG. 16) of RAM 206 (FIG. 2) (S2a). If the angle is at least 160 degrees or more, but less than 180 degrees (S1b), CPU 211 retrieves Tx 510 from area 305 (FIG. 16) of RAM 206 (S2b). In the same manner, if the angle is at least 135 degrees or more, but less than 160 degrees (S1c), CPU 211 retrieves Tx 511 from area 305 of RAM 206 (S2c); if the angle is at least 110 degrees or more, but less than 135 degrees (S1d), CPU 211 retrieves Tx 512 from area 305 of RAM 206 (S2d); and if the angle is at least 20 degrees or more, but less than 110 degrees, (S1e), CPU 211 retrieves Tx 513 from area 305 of RAM 206 (S2e).

Figure 18B:
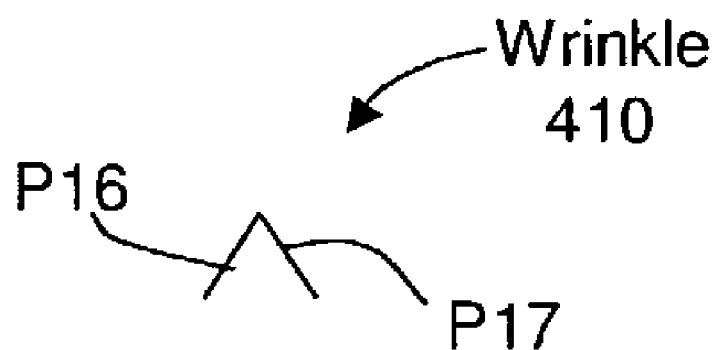

Instead of pasting textures to polygons in order to display wrinkles, a plurality of polygons may be used to produce wrinkles as described in FIG. 18a through FIG. 18e. Assuming that arm AR is covered with fabric FB. When arm AR is stretched as described in FIG. 18a and the angle of joint JT produced by lower arm LA and upper arm UA is 180 degrees, no wrinkles are shown on or near joint JT. As illustrated in FIG. 18b, a small wrinkle 410 can be produced by two small polygons, i.e., P16 and P17. As illustrated in FIG. 18c, a wrinkle 410 larger than the one described in FIG. 18b can be produced by the same set of polygons, i.e., P16 and P17 by stretching them vertically. As illustrated in FIG. 18d, a wrinkle 410 larger than the one described in FIG. 18c can be produced by the same set of polygons, i.e., P16 and P17 by further stretching them vertically. As illustrated in FIG. 18e, a wrinkle 410 larger than the one described in FIG. 18d can be produced by the same set of polygons, i.e., P16 and P17 by even more stretching them vertically. The operation of the wrinkle generating software in this embodiment is similar to the one described in FIG. 11. Such operation is not shown in the drawings. First of all, CPU 211 (FIG. 2) calculates the angle of joint JT produced by lower arm LA and upper arm UA. If the angle is 180 degrees, CPU 211 does not produce any wrinkles with polygons. If the angle is at least 160 degrees or more, but less than 180 degrees, CPU 211 produces a small set of polygons P16 and P17 to display one wrinkle, wrinkle 410, as illustrated in FIG. 18b. In the same manner, if the angle is at least 135 degrees or more, but less than 160 degrees, CPU 211 stretches polygons P16 and P17 vertically and makes wrinkle 410 as illustrated in FIG. 18c; if the angle is at least 110 degrees or more, but less than 135 degrees, CPU 211 further stretches polygons P16 and P17 vertically and make wrinkle 410 as illustrated in FIG. 18d; and if the angle is at least 20 degrees or more, but less than 110 degrees, CPU 211 even more stretches polygons P16 and P17 vertically and make wrinkle 410 as illustrated in FIG. 18e.

FIG. 19 through FIG. 24e illustrate the method of determining the amount and the height of wrinkles that should be displayed on monitor 201 (FIG. 2).

Figure 19:
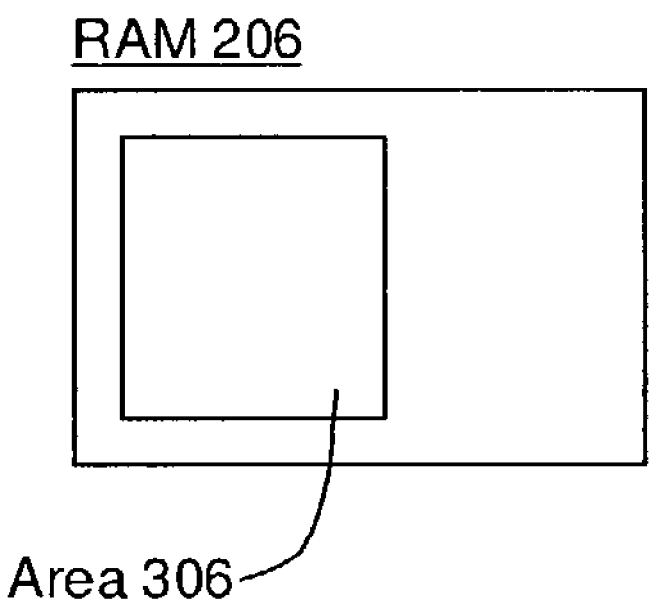
FIG. 19 is a simplified illustration of the area included in the RAM.

As illustrated in FIG. 19, RAM 206 (FIG. 2) includes area 306. Area 306 stores a plurality of data which are necessary to determine the amount and the height of the wrinkles.

FIG. 20 illustrates the content of area 306 (FIG. 19) of RAM 206 (FIG. 2). As illustrated in FIG. 20, area 306 includes three types of data, i.e., the data representing the angle of joint JT (FIG. 4) produced by upper arm UA (FIG. 4) and lower arm LA (FIG. 4), the data representing the amount of wrinkles displayed, and the data representing the height of wrinkles displayed. For example, the amount and the height of wrinkle displayed is 0 when the angle of joint JT produced by upper arm UA and lower arm LA is 180 degrees. However, the amount of the wrinkle displayed is 1 and the height of the wrinkle displayed is 1 when the angle is at least 160 degrees or more, but less than 180 degrees; the amount of the wrinkle displayed is 1 and the height of wrinkle displayed is 2 when the angle is at least 135 degrees or more, but less than 160 degrees; the amount of the wrinkles displayed is 3 and the height of the wrinkles displayed is 1, 2, and 1 respectively when the angle is at least 110 degrees or more, but less than 135 degrees; and the amount of the wrinkles displayed is 5 and the height of the wrinkles displayed is 1, 2, 3, 2, and 1 respectively when the angle is at least 20 degrees or more, but less than 110 degrees.

Figure 21A:
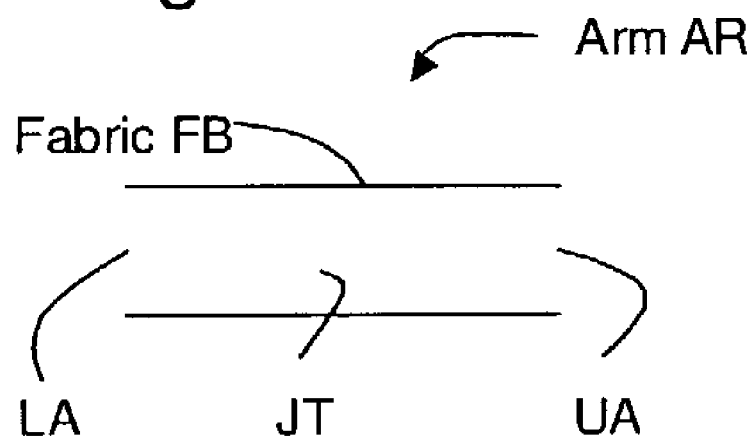
Figure 21B:
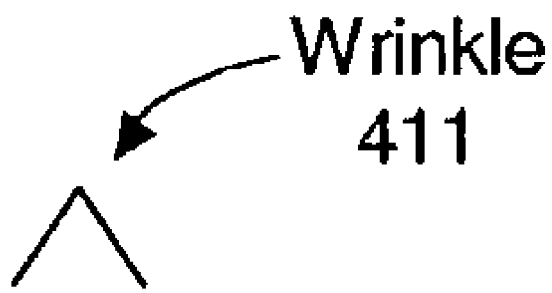
Figure 21C:
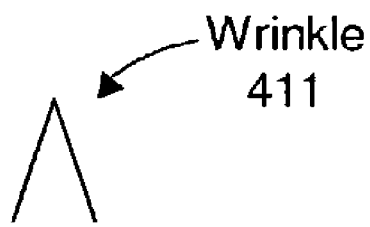
Figure 21E:
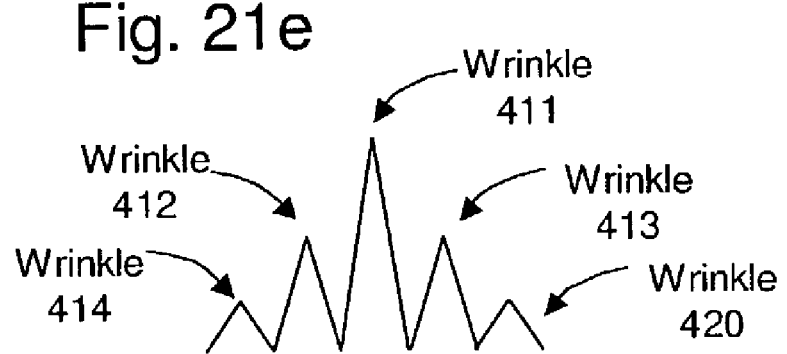

FIG. 21a through FIG. 21e illustrate how arm AR is displayed on monitor 201 (FIG. 2) in accordance with the data stored in area 306 (FIG. 19) of RAM 206 (FIG. 2). Assuming that arm AR is covered with fabric FB. When arm AR is stretched as described in FIG. 21a and the angle of joint JT produced by lower arm LA and upper arm UA is 180 degrees, no wrinkles are shown on or near joint JT. As illustrated in FIG. 21b, when arm AR is slightly bent and the angle of joint JT produced by lower arm LA and upper arm UA is at least 160 degrees or more, but less than 180 degrees, a small wrinkle, i.e., wrinkle 411 is displayed on monitor 201. As illustrated in FIG. 21c, when arm AR is further bent and the angle of joint JT produced by lower arm LA and upper arm UA is at least 135 degrees or more, but less than 160 degrees, wrinkle 411 which is larger than the one described in FIG. 21b is displayed on monitor 201. As illustrated in FIG. 21d, when the angle of joint JT produced by lower arm LA and upper arm UA is at least 110 degrees or more, but less than 135 degrees, wrinkle 411 as large as the one described in FIG. 21c is displayed on monitor 201 and two small wrinkles, i.e., wrinkles 412 and 413 appear on the left and right sides of wrinkle 411 respectively. As illustrated in FIG. 21e, when the angle of joint JT produced by lower arm LA and upper arm UA is at least 20 degrees or more, but less than 110 degrees, wrinkle 411 larger than the one described in FIG. 21d is displayed on monitor 201 and wrinkles 412 and 413 as large as the one described in FIG. 21c appear on both sides of wrinkle 411 respectively, and in addition small wrinkles 414 and 420 appear adjacent to wrinkles 412 and 413 respectively.

FIG. 22 illustrates a plurality of textures utilized to display wrinkles on monitor 201 (FIG. 2). As illustrated in FIG. 22, RAM 206 (FIG. 2) includes area 307. Area 307 stores a plurality of textures which are pasted on polygons, i.e., textures Tx 515, Tx 516, Tx 517, and Tx 518. Tx 515 includes the image of wrinkle 411 illustrated in FIG. 21b; Tx 516 includes the image of wrinkle 411 illustrated in FIG. 21c; Tx 517 includes the image of wrinkles 411, 412, and 413 illustrated in FIG. 21d; and Tx 518 includes the image of wrinkles 411, 412, 413, 414, and 420 illustrated in FIG. 21e.

FIG. 23 illustrates the operation of wrinkle generating software stored in area 301 (FIG. 3) of RAM 206 (FIG. 2). First of all, CPU 211 (FIG. 2) calculates the angle of joint JT produced by lower arm LA and upper arm UA. If the angle is 180 degrees (S1a), CPU 211 does not access area 307 (FIG. 22) of RAM 206 (S2a). If the angle is at least 160 degrees or more, but less than 180 degrees (S1b), CPU 211 retrieves Tx 515 from area 307 of RAM 206 (S2b). In the same manner, if the angle is at least 135 degrees or more, but less than 160 degrees (S1c), CPU 211 retrieves Tx 516 from area 307 of RAM 206 (S2c); if the angle is at least 110 degrees or more, but less than 135 degrees (S1d), CPU 211 retrieves Tx 517 from area 307 of RAM 206 (S2d); and if the angle is at least 20 degrees or more, but less than 110 degrees (S1e), CPU 211 retrieves Tx 518 from area 307 of RAM 206 (S2e).

Figure 24C:
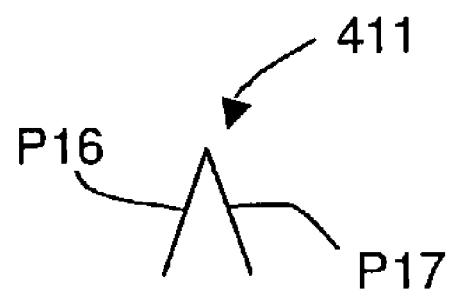
Figure 24D:
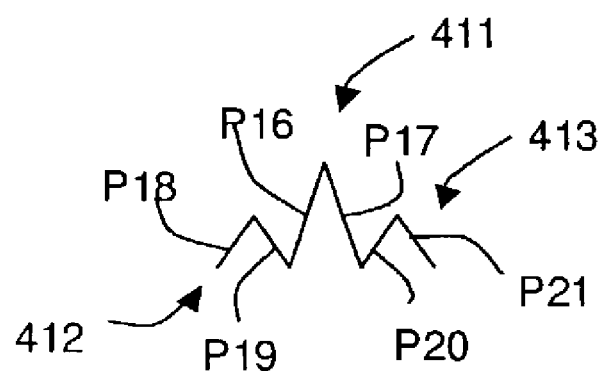
Figure 24E:
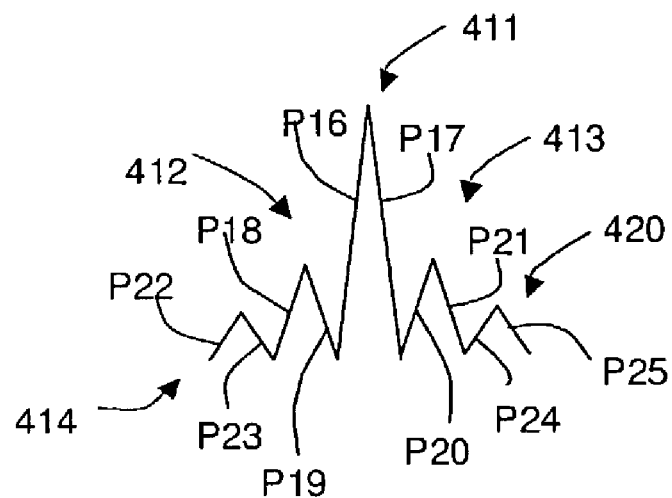

Instead of pasting textures to polygons in order to display wrinkles, a plurality of polygons may be used to produce wrinkles as described in FIG. 24a through FIG. 24e. Assuming that arm AR is covered with fabric FB. When arm AR is stretched as described in FIG. 24a and the angle of joint JT produced by lower arm LA and upper arm UA is 180 degrees, no wrinkles are shown on or near joint JT. As illustrated in FIG. 24b, when arm AR is slightly bent and the angle of joint JT produced by lower arm LA and upper arm UA is at least 160 degrees or more, but less than 180 degrees, a small wrinkle, i.e., wrinkle 411 is displayed on monitor 201 by a set of two polygons P16 and P17. As illustrated in FIG. 24c, when arm AR is further bent and the angle of joint JT produced by lower arm LA and upper arm UA is at least 135 degrees or more, but less than 160 degrees, wrinkle 411 which is larger than the one described in FIG. 24b is displayed on monitor 201 by stretching the set of two polygons P16 and P17 vertically. As illustrated in FIG. 24d, when the angle of joint JT produced by lower arm LA and upper arm UA is at least 110 degrees or more, but less than 135 degrees, wrinkle 411 as large as the one described in FIG. 24c is displayed on monitor 201 by the set of polygons P16 and P17 and two small wrinkles, i.e., wrinkles 412 and 413 appear on the left and right sides of wrinkle 411 respectively. Wrinkle 412 is produced by the set of polygons P18 and P 19, and wrinkle 413 is produced by the set of polygons P20 and P21. As illustrated in FIG. 21e, when the angle of joint JT produced by lower arm LA and upper arm UA is at least 20 degrees or more, but less than 110 degrees, wrinkle 411 larger than the one described in FIG. 21d is displayed on monitor 201 by further stretching the set of polygons P16 and P17 vertically and wrinkles 412 and 413 as large as wrinkle 411 in FIG. 21d appear on both sides of wrinkle 411 respectively. Here, wrinkles 412 and 413 are produced by the sets of P18 and P 19, and P20 and P21 respectively, and they are stretched to increase the height thereof. Additional wrinkles 414 and 420 appear adjacent to wrinkles 412 and 413 respectively where wrinkles 414 and 420 are produced by the sets of P22 and P23, and P24 and P25 respectively. The operation of the wrinkle generating software in this embodiment is similar to the one described in FIG. 11. Such operation is not shown in the drawings. First of all, CPU 211 (FIG. 2) calculates the angle of joint JT produced by lower arm LA and upper arm UA. If the angle is 180 degrees, CPU 211 does not produce any wrinkles with polygons. If the angle is at least 160 degrees or more, but less than 180 degrees, CPU 211 produces a small set of polygons P16 and P17 to display wrinkle 411 as illustrated in FIG. 24b. In the same manner, if the angle is at least 135 degrees or more, but less than 160 degrees, CPU 211 stretches polygons P16 and P17 vertically and make wrinkle 411 as illustrated in FIG. 24c; if the angle is at least 110 degrees or more, but less than 135 degrees, CPU 211 stretches polygons P16 and P17 vertically and make wrinkle 411 as illustrated in FIG. 24d and add two small wrinkles, i.e., wrinkle 412 and 413 by producing P18 and P19, and P20 and P21 respectively; and if the angle is at least 20 degrees or more, but less than 110 degrees, CPU 211 further stretches polygons P16 and P17 vertically and make wrinkle 411 as illustrated in FIG. 24e. CPU 211 increases the height of wrinkles 412 and 413 by stretching the two sets of polygons P18 and P19, and P20 and P21 respectively. In addition, CPU 211 adds two small wrinkles 414 and 420 adjacent to wrinkles 412 and 413 respectively by producing two sets of polygons P22 and P23, and P24 and P25 respectively.

FIG. 25 through FIG. 32e illustrate the method of determining the muscle movement of upper arm UA.

Figure 25:
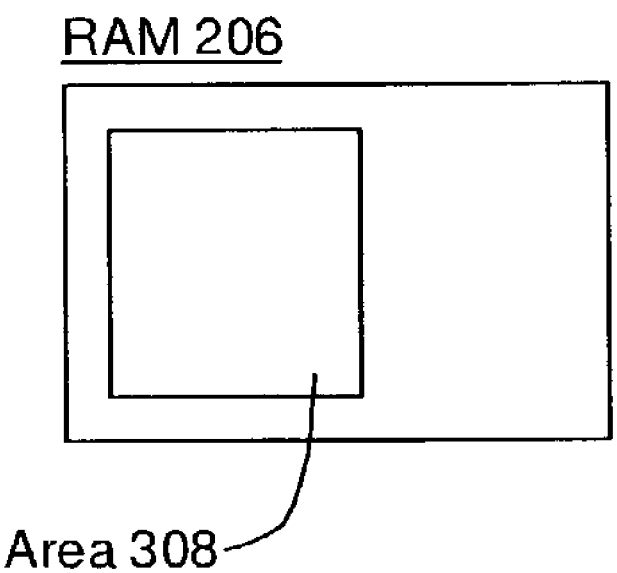
FIG. 25 is a simplified illustration of the area included in the RAM.

FIG. 25 illustrates the content of area 308 of RAM 206 (FIG. 2). Area 308 stores the muscle movement generating software which administers the muscle movement of upper arm UA as described in details hereinafter.

Figure 26:
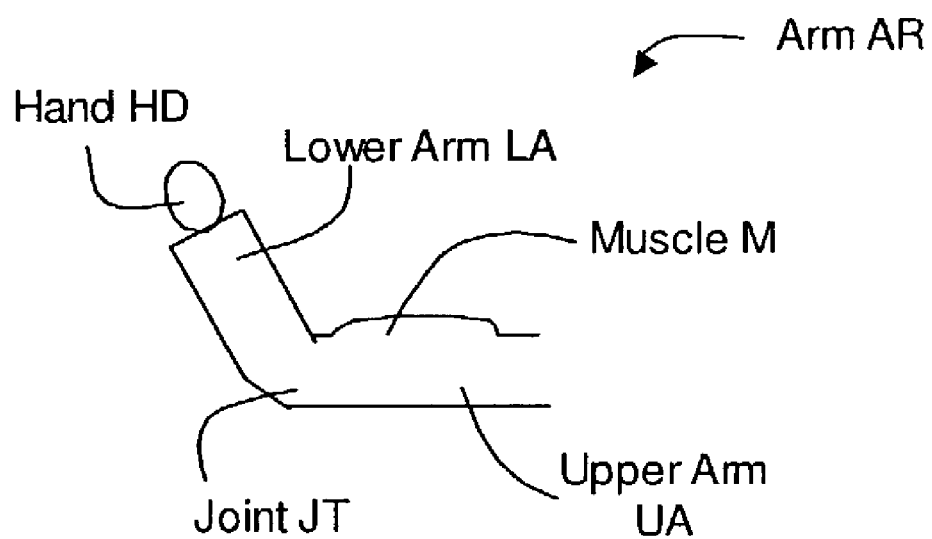
FIG. 26 is a simplified illustration of the method to display the arm on the monitor.

FIG. 26 illustrates the concept of the present invention. As described in FIG. 26, arm AR of an object (a human being) is composed of hand HD, lower arm LA, joint JT, and upper arm UA. When arm AR is bent, muscle M bulges and thereby increases the thickness of upper arm UA.

Figure 27:
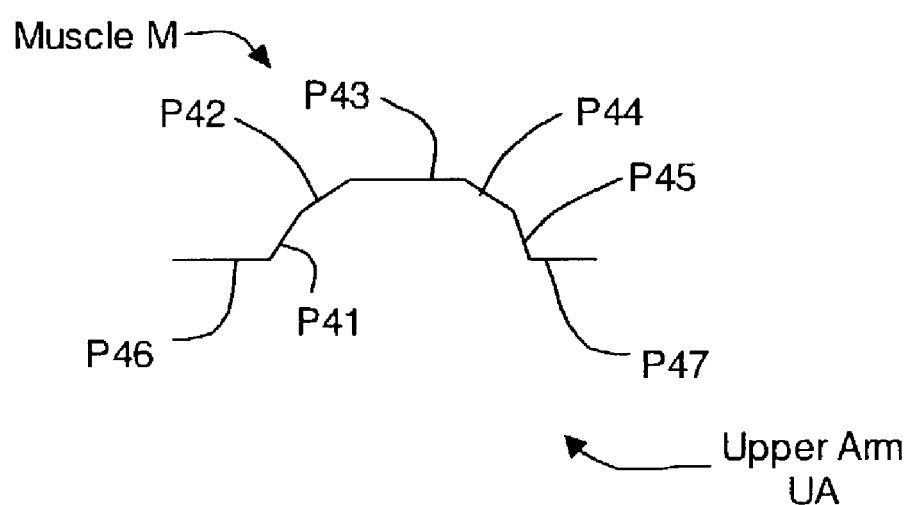
FIG. 27 is a simplified illustration of the method to display muscle movement.

FIG. 27 illustrates the method of generating the muscle movement. The most convenient way to generate the muscle movement is to have the muscle M composed of a plurality of polygons. In the example described in FIG. 27, muscle M is composed of polygons P42, P43, P44, and P45. Polygons P46 and P47 are part of upper arm UA, but not part of muscle M.

Figure 28:
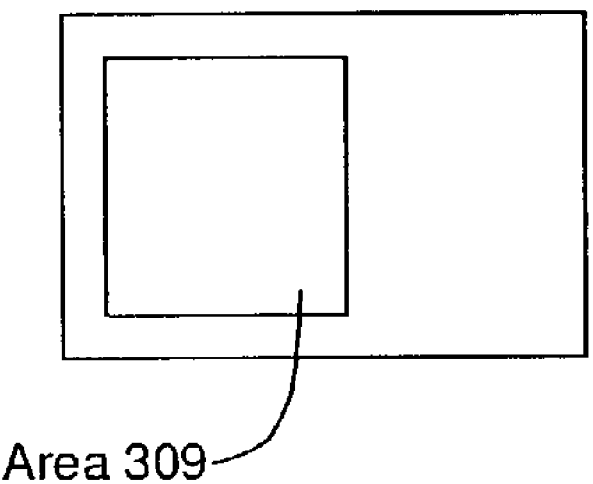
FIG. 28 is a simplified illustration of the area included in the RAM.

As illustrated in FIG. 28, RAM 206 (FIG. 2) includes area 309. Area 309 stores a plurality of data which are necessary to produce the muscle movement of upper arm UA.

FIG. 29 illustrates the content of area 309 (FIG. 28) of RAM 206. Area 309 includes two types of data, i.e., the data representing the angle of joint JT (FIG. 26) produced by upper arm UA (FIG. 26) and lower arm LA (FIG. 26), and the data representing the property of the muscle movement. The more the value of muscle property increases the more the thickness of upper arm UA increases. For example, the value of muscle property is 0 when the angle of joint JT produced by upper arm UA and lower arm LA is 180 degrees. The value of the muscle property increases as the angle of joint JT produced by upper arm UA and lower arm LA decreases. In the present example described in FIG. 29, the value of muscle property is 1 when the angle is at least 160 degrees or more, but less than 180 degrees; the value of muscle property is 2 when the angle is at least 135 degrees or more, but less than 160 degrees; the value of muscle property is 3 when the angle is at least 110 degrees or more, but less than 135 degrees; and the value of muscle property is 4 when the angle is at least 20 degrees or more, but less than 110 degrees.

FIG. 30a through FIG. 30e illustrate how arm AR is displayed on monitor 201 (FIG. 2) in accordance with the data stored in area 309 (FIG. 28) of RAM 206 (FIG. 2). When arm AR is stretched as described in FIG. 30a and the angle of joint JT produced by lower arm LA and upper arm UA is 180 degrees, no muscle movement appears on upper arm UA. As described in FIG. 30b, when arm AR is slightly bent and the angle of joint JT produced by lower arm LA and upper arm UA is at least 160 degrees or more, but less than 180 degrees, the muscle movement occurs and muscle M bulges. As described in FIG. 30c, when arm AR is further bent and the angle of joint JT produced by lower arm LA and upper arm UA is at least 135 degrees or more, but less than 160 degrees, muscle M bulges more compared to the one shown in FIG. 30b. As described in FIG. 30d, when the angle of joint JT produced by lower arm LA and upper arm UA is at least 110 degrees or more, but less than 135 degrees, muscle M bulges more compared to the one shown in FIG. 30c. As described in FIG. 30e, when the angle of joint JT produced by lower arm LA and upper arm UA is at least 20 degrees or more, but less than 110 degrees, muscle M bulges more compared to the one shown in FIG. 30d.

Figure 30A:
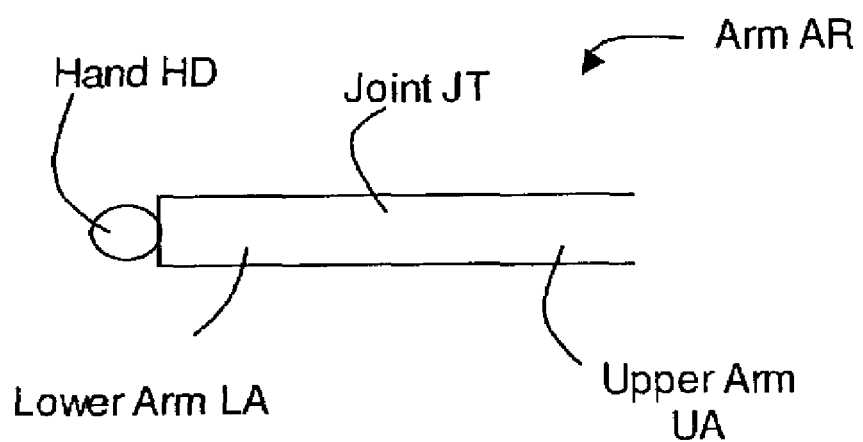
FIGS. 30a through 30e are simplified illustrations of the methods to display the arm on the monitor.
Figure 30B:
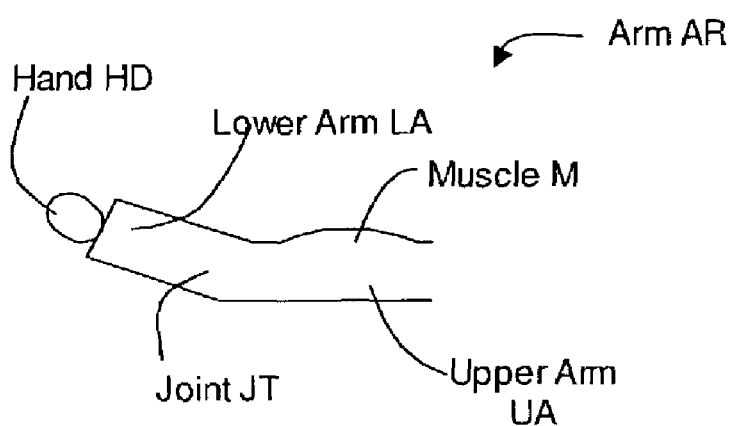
Figure 30C:
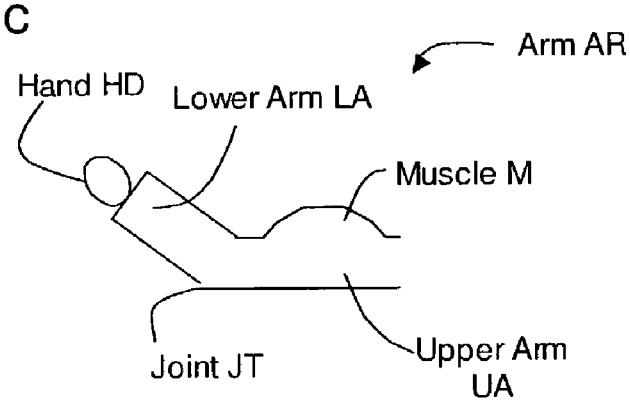
Figure 30D:
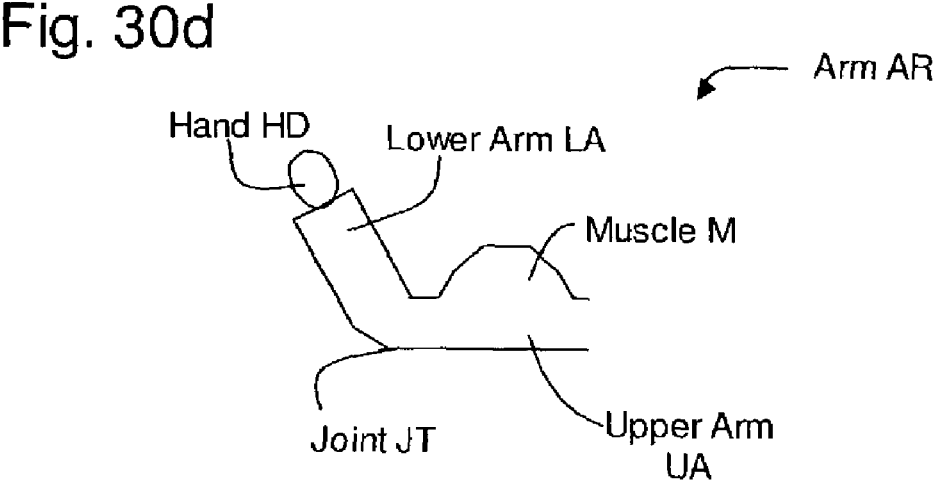
Figure 30E:
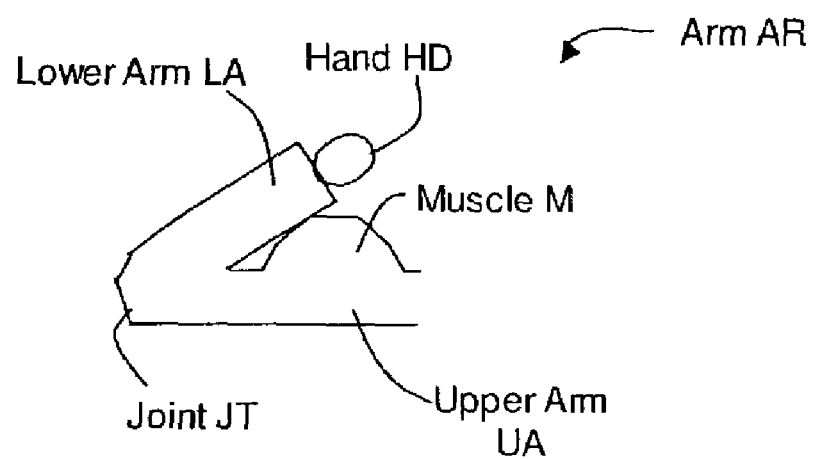
Figure 31:
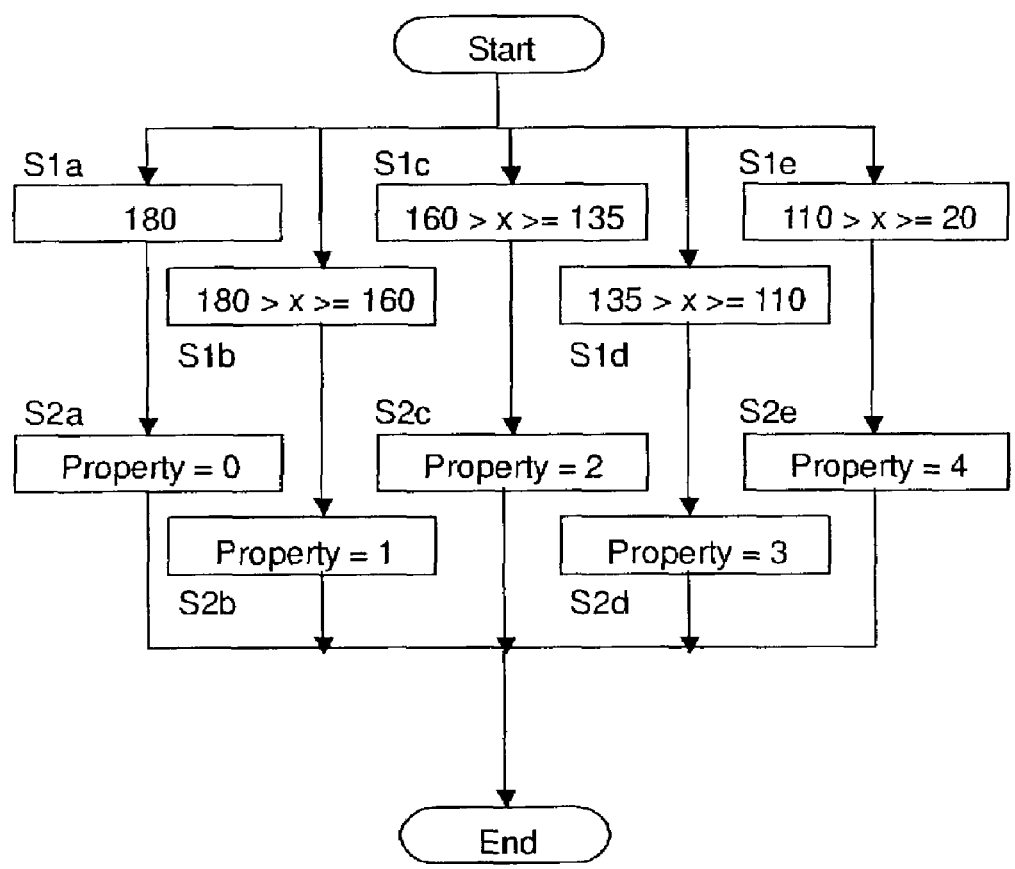
FIG. 31 is a flowchart illustration of illustrating the operation of the muscle movement generating software.

FIG. 31 illustrates the operation of the muscle movement generating software stored in area 308 (FIG. 25) of RAM 206 (FIG. 2). First of all, CPU 211 (FIG. 2) calculates the angle of joint JT produced by lower arm LA and upper arm UA. If the angle is 180 degrees (S1a), CPU 211 retrieves the muscle property data from area 309 (FIG. 29) of RAM 206 (FIG. 2). Since the muscle property is 0, no muscle movement occurs and upper arm UA described in FIG. 30a is shown (S2a). If the angle is at least 160 degrees or more, but less than 180 degrees (S1b), CPU 211 retrieves the muscle property which is 1 and upper arm UA described in FIG. 30b is shown (S2b). In the same manner, if the angle is at least 135 degrees or more, but less than 160 degrees (S1c), CPU 211 retrieves the muscle property which is 2 and upper arm UA described in FIG. 30c is shown (S2c); if the angle is at least 110 degrees or more, but less than 135 degrees (S1d), CPU 211 retrieves the muscle property which is 3 and upper arm UA described in FIG. 30d is shown (S2d); and if the angle is at least 20 degrees or more, but less than 110 degrees (S1e), CPU 211 retrieves the muscle property which is 4 and upper arm UA described in FIG. 30e is shown (S2e).

FIG. 32a through FIG. 32e illustrate how the polygons are utilized in displaying the muscle movement.

Figure 32A:
FIGS. 32a through 32e are simplified illustrations of the methods to display the muscle movement on the monitor.
Figure 32B:
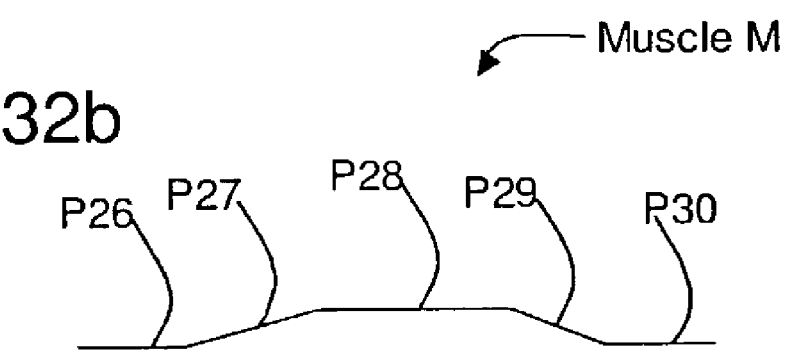
Figure 32C:
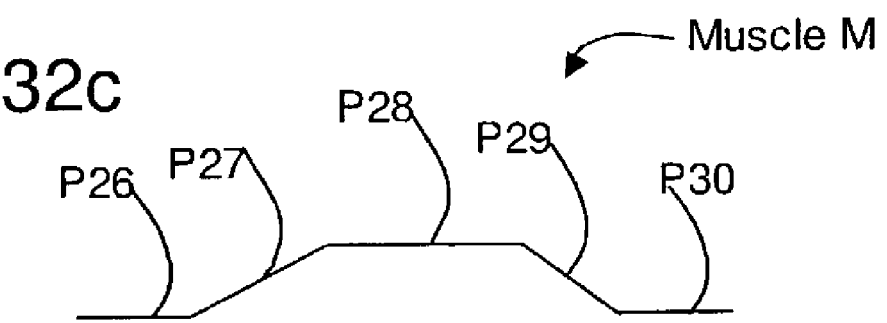
Figure 32D:
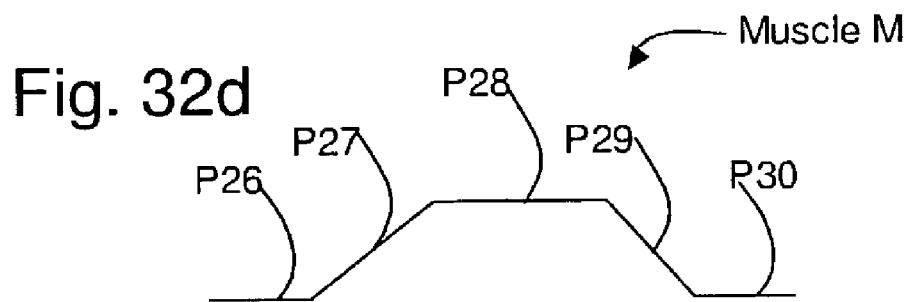
Figure 32E:
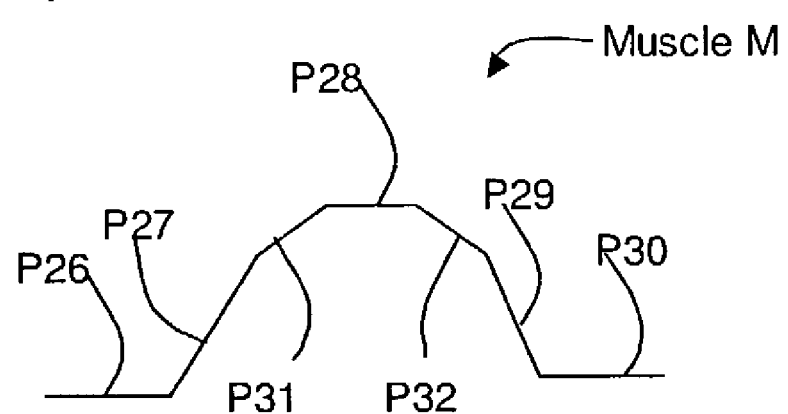

As illustrated in FIG. 32a, when arm AR is stretched and the angle of joint JT produced by lower arm LA and upper arm UA is 180 degrees, no muscle movement appears on upper arm UA and the polygons consisting of muscle M, i.e., P27, P28, and P29 remains in a straight line or almost in a straight line. Polygons P26 and P30 are part of upper arm UA, however, does not compose muscle M. As described in FIG. 32b, when arm AR is slightly bent and the angle of joint JT produced by lower arm LA and upper arm UA is at least 160 degrees or more, but less than 180 degrees, the muscle movement occurs and muscle M composed of polygons P27, P28, and P29 bulges. As described in FIG. 32c, when arm AR is further bent and the angle of joint JT produced by lower arm LA and upper arm UA is at least 135 degrees or more, but less than 160 degrees, muscle M composed of polygons P27, P28, and P29 bulges more compared to the one shown in FIG. 32b. As described in FIG. 32d, when the angle of joint JT produced by lower arm LA and upper arm UA is at least 110 degrees or more, but less than 135 degrees, muscle M composed of polygons P27, P28, and P29 bulges more compared to the one shown in FIG. 32c. As described in FIG. 32e, when the angle of joint JT produced by lower arm LA and upper arm UA is at least 20 degrees or more, but less than 110 degrees, muscle M bulges more compared to the one shown in FIG. 32d. Here, muscle M is composed of polygons P27, P28, and P29, and new polygons P31 and P32 are inserted between P27 and P28, and P28 and P29, respectively.

Having thus described a presently preferred embodiment of the present invention, it will not be appreciated that the aspects of the invention have been fully achieved, and it will be understood by those skilled in the art that many changes in construction and circuitry and widely differing embodiments and applications of the invention will suggest themselves without departing from the spirit and scope of the present invention. The disclosures and the description herein are intended to be illustrative and are not in any sense limiting of the invention, more preferably defined in scope by the following claims.

The invention claimed is:

1. A computer-implemented arm joint wrinkle simulation method which generates an object with one or more arm joint wrinkles, said method comprising the steps of:

(a) retrieving an image of said object from a data storage area, and (b) simulating said one or more arm joint wrinkles on said object;

wherein said object comprises an arm;

said arm comprises an upper arm, a lower arm, and an arm joint;

said upper arm and said lower arm are connected by said arm joint;

an arm joint angle value which indicates the angle created by said upper arm and said lower arm at said arm joint is variable;

when said arm joint angle value indicates a first value, a wrinkle image of a first length is generated on or near said arm joint; and when said arm joint angle value indicates a second value, a wrinkle image of a second length which is shorter than said first length is generated on or near said arm joint, wherein said second value is larger than said first value.

2. The computer-implemented arm joint wrinkle simulation method of claim 1, wherein said one or more arm joint wrinkles are generated by a texture mapping method.

3. The computer-implemented arm joint wrinkle simulation method of claim 1, wherein said one or more arm joint wrinkles are expressed by light colors to indicate the non-shadow surfaces thereof and dark colors to indicate the shadow surfaces thereof.

4. The computer-implemented arm joint wrinkle simulation method of claim 1, wherein said one or more arm joint wrinkles indicate one or more wrinkles generated on a fabric.

5. The computer-implemented arm joint wrinkle simulation method of claim 1, wherein said one or more arm joint wrinkles are not generated when said arm joint angle value indicates a third value.

6. The computer-implemented arm joint wrinkle simulation method of claim 1, wherein the height of said one or more arm joint wrinkles varies in accordance with said arm joint angle value.

7. A computer-implemented arm joint wrinkle simulation method which generates an object with one or more arm joint wrinkles, said method comprising the steps of:

(a) retrieving an image of said object from a data storage area, and (b) simulating said one or more arm joint wrinkles on said object;

wherein said object comprises an arm;

said arm comprises an upper arm, a lower arm, and an arm joint;

said upper arm and said lower arm are connected by said arm joint;

an arm joint angle value which indicates the angle created by said upper arm and said lower arm at said arm joint is variable;

when said arm joint angle value indicates a first value, a first amount of said one or more arm joint wrinkles is generated on or near said arm joint;

wherein said first amount is a whole number;

when said arm joint angle value indicates a second value, a second amount of said one or more arm joint wrinkles is generated on or near said arm joint;

wherein said second amount is a whole number; and wherein said second value is larger than said first value and said second amount is smaller than said first amount.

8. The computer-implemented arm joint wrinkle simulation method of claim 7, wherein said one or more arm joint wrinkles are generated by a texture mapping method.

9. The computer-implemented arm joint wrinkle simulation method of claim 7, wherein said one or more arm joint wrinkles are expressed by light colors to indicate the non-shadow surfaces thereof and dark colors to indicate the shadow surfaces thereof.

10. The computer-implemented arm joint wrinkle simulation method of claim 7, wherein said one or more arm joint wrinkles indicate one or more wrinkles generated on a fabric.

11. The computer-implemented arm joint wrinkle simulation method of claim 7, wherein said one or more arm joint wrinkles are not generated when said arm joint angle value indicates a third value.

12. The computer-implemented arm joint wrinkle simulation method of claim 7, wherein the height of said one or more arm joint wrinkles varies in accordance with said arm joint angle value.

13. A computer-implemented arm joint wrinkle simulation method which generates an object with one or more arm joint wrinkles, said method comprising the steps of:
 (a) retrieving an image of said object from a data storage area, and
 (b) simulating said one or more arm joint wrinkles on said object;
 wherein said object comprises an arm;
 said arm comprises an upper arm, a lower arm, and an arm joint;
 said upper arm and said lower arm are connected by said arm joint;
 an arm joint angle value which indicates the angle created by said upper arm and said lower arm at said arm joint is variable;
 when said arm joint angle value indicates a first value, a wrinkle image of a first length is generated on or near said arm joint and a first amount of said one or more arm joint wrinkles is generated on or near said arm joint;
 said first amount includes the number of said wrinkle image of said first length wherein said first amount is a whole number;
 when said arm joint angle value indicates a second value, a wrinkle image of a second length which is shorter than said first length is generated on or near said arm joint and a second amount of said one or more arm joint wrinkles is generated on or near said arm joint;
 said second amount includes the number of said wrinkle image of said second length wherein said second amount is a whole number; and
 wherein said second value is larger than said first value and said second amount is smaller than said 1st amount.

14. The computer-implemented arm joint wrinkle simulation method of claim 13, wherein said one or more arm joint wrinkles are generated by a texture mapping method.

15. The computer-implemented arm joint wrinkle simulation method of claim 13, wherein said one or more arm joint wrinkles are expressed by light colors to indicate the non-shadow surfaces thereof and dark colors to indicate the shadow surfaces thereof.

16. The computer-implemented arm joint wrinkle simulation method of claim 13, wherein said one or more arm joint wrinkles indicate one or more wrinkles generated on a fabric.

17. The computer-implemented arm joint wrinkle simulation method of claim 13, wherein said one or more arm joint wrinkles are not generated when said arm joint angle value indicates a third value.

18. The computer-implemented arm joint wrinkle simulation method of claim 13, wherein the height of said one or more arm joint wrinkles varies in accordance with said arm joint angle value.

* * * * *